(12) United States Patent
Nihei

(10) Patent No.: US 7,456,856 B2
(45) Date of Patent: Nov. 25, 2008

(54) CLOCK SIGNAL GENERATION CIRCUIT, OPTICAL SCANNING APPARATUS, AND IMAGE FORMING APPARATUS

(75) Inventor: Yasuhiro Nihei, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 169 days.

(21) Appl. No.: 11/355,882

(22) Filed: Feb. 17, 2006

(65) Prior Publication Data

US 2006/0209170 A1 Sep. 21, 2006

(30) Foreign Application Priority Data

Feb. 21, 2005 (JP) .............................. 2005-044075

(51) Int. Cl.
*B41J 2/435* (2006.01)
*B41J 2/47* (2006.01)

(52) U.S. Cl. ....................... 347/250; 347/235

(58) Field of Classification Search ......... 347/234–235, 347/243, 248–250, 259–261; 358/474
See application file for complete search history.

(56) References Cited

U.S. PATENT DOCUMENTS

| | | | | |
|---|---|---|---|---|
| 4,931,882 A | * | 6/1990 | Takeda et al. ............... | 358/474 |
| 5,164,843 A | * | 11/1992 | Swanberg ................... | 358/474 |
| 6,064,419 A | * | 5/2000 | Uchiyama ................... | 347/250 |
| 6,259,467 B1 | * | 7/2001 | Hanna ......................... | 347/249 |
| 2006/0209170 A1 | | 9/2006 | Nihei | |

FOREIGN PATENT DOCUMENTS

| | | |
|---|---|---|
| JP | 11-167081 | 6/1999 |
| JP | 2001-228415 | 8/2001 |
| JP | 2002-36626 | 2/2002 |

OTHER PUBLICATIONS

U.S. Appl. No. 12/029,115, filed Feb. 11, 2008, Omori, et al.
U.S. Appl. No. 12/055,666, filed Mar. 26, 2008, Tanabe, et al.

* cited by examiner

*Primary Examiner*—Hai C Pham
(74) *Attorney, Agent, or Firm*—Oblon, Spivak, McClelland, Maier & Neustadt, P.C.

(57) ABSTRACT

The present invention discloses a clock signal generation circuit for generating one or more clock signals for performing a scanning operation by scanning a light beam from a light source to a scan target. The clock signal generation circuit includes a determination circuit for determining authenticity of start information in accordance with at least one of the length of the start information and the timing at which the start information is input, and a generation circuit for generating the clock signals in synchronization with the start information when the determination circuit determines that the start information is authentic.

9 Claims, 27 Drawing Sheets

FIG.5

| Sphase b₂ b₁ b₀ | PHASE SHIFT AMOUNT |
|---|---|
| 0  0  0 | 0 |
| 0  0  1 | +1/16 |
| 0  1  0 | +2/16 |
| 0  1  1 | +3/16 |
| 1  1  1 | −1/16 |
| 1  1  0 | −2/16 |
| 1  0  1 | −3/16 |

FIG.12

| input | | | output | |
|---|---|---|---|---|
| Sphase $b_2$ $b_1$ $b_0$ | | status | Dcnt1 | Dcnt2 |
| 0 0 0 | | 0 | 010 | 010 |
| | | 1 | 010 | 010 |
| 0 0 1 | | 0 | 010 | 001 |
| | | 1 | 001 | 010 |
| 0 1 0 | | 0 | 001 | 001 |
| | | 1 | 001 | 001 |
| 0 1 1 | | 0 | 001 | 000 |
| | | 1 | 000 | 001 |
| 1 1 1 | | 0 | 011 | 010 |
| | | 1 | 010 | 011 |
| 1 1 0 | | 0 | 011 | 011 |
| | | 1 | 011 | 011 |
| 1 0 1 | | 0 | 100 | 011 |
| | | 1 | 011 | 100 |

FIG.16

| Dcnt1 | CTL1b |
|-------|--------|
| 000 | D0(S18) |
| 001 | D1(S17) |
| 010 | D2(S16) |
| 011 | D3(S15) |
| 100 | D4(S14) |

FIG.19

| Dcnt2 | CTL2b |
|-------|-------|
| 000 | D0(S28) |
| 001 | D1(S27) |
| 010 | D2(S26) |
| 011 | D3(S25) |
| 100 | D4(S24) |

CLOCK SIGNAL GENERATION CIRCUIT, OPTICAL SCANNING APPARATUS, AND IMAGE FORMING APPARATUS

BACKGROUND OF THE INVENTION

1. Field of the Invention

The present invention relates to a clock signal generation circuit, an optical scanning apparatus, and an image forming apparatus, and more particularly to a signal generation circuit for generating clock signals used when scanning a scanning target with a light beam from a light source, an optical scanning apparatus including the signal generation circuit, and an image forming apparatus including the optical scanning apparatus.

2. Description of the Related Art

In an image forming apparatuses (e.g. laser printers, digital copiers), the light, which is modulated in accordance with image information, is condensed from a light source onto the photoconductor via a polygon mirror, scanning lens, etc., and is moved (scanned) in a predetermined direction (scanning direction), to thereby form latent images (electrostatic images) on the photoconductor. Then, the image information is made visible by attaching toner to the latent images.

In recent years and continuing, the demand for forming images with higher quality is growing. Therefore, under such circumstances, the problem where a beam spot deviates from a predetermined position on a photoconductor cannot be ignored. This problem is caused by, for example, inclination of the deflection/reflection face of the polygon mirror, inconsistency of the distance from the rotation axis of the deflection/reflection face, and changes in the wavelength of the light from the light source.

Various technologies (see, for example, Japanese Laid-Open Patent Application Nos.11-167081, 2001-228415, and 2002-36626) are proposed for correcting the deviation of the beam spot. The aforementioned technologies correct the deviation by correcting clock signals used during the scanning of a photoconductor (hereinafter referred to as "pixel clock signals"). However, with the apparatus disclosed in the aforementioned Japanese Laid-Open Patent Application Nos.11-167081, 2001-228415, and 2002-36626, the signals, which are output from a photo-detecting element serving to detect the timing for starting the scanning of a single line, may be adversely affected by noise. This results in the formation of irregular latent images and leads to the degradation of image quality.

SUMMARY OF THE INVENTION

It is a general object of the present invention to provide a clock signal generation circuit, an optical scanning apparatus, and an image forming apparatus that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a clock signal generation circuit, an optical scanning apparatus, and an image forming apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a clock signal generation circuit for generating one or more clock signals for performing a scanning operation by scanning a light beam from a light source to a scan target, the clock signal generation circuit including: a determination circuit for determining authenticity of start information in accordance with at least one of the length of the start information and the timing at which the start information is input; and a generation circuit for generating the clock signals in synchronization with the start information when the determination circuit determines that the start information is authentic.

Furthermore, the present invention provides an optical scanning apparatus for performing a scanning operation by scanning a light beam from a light source to a scan target scanning, the optical scanning apparatus including: a detection sensor for detecting the start of the scanning operation and outputting signals including start information indicative of the start of the scanning operation; a clock signal generation circuit for receiving the signals output from the detection sensor, the clock signal generation circuit including a determination circuit for determining authenticity of the start information in accordance with at least one of the length of the start information and the timing at which the start information is input, and a generation circuit for generating the clock signals in synchronization with the start information when the determination circuit determines that the start information is authentic; and an optical control circuit for controlling the light source in accordance with the clock signals generated by the clock signal generation circuit.

Furthermore, the present invention provides an image forming apparatus including the optical scanning apparatus according to an embodiment of the present invention.

Other objects and further features of the present invention will be apparent from the following detailed description when read in conjunction with the accompanying drawings.

BRIEF DESCRIPTION OF THE DRAWINGS

FIG. 5 shows an exemplary table for describing output signals of a deviation information detection circuit according to an embodiment of the present invention;

FIG. 12 is an exemplary timing chart for describing the relation between input signals and output signals of a control data generation circuit according to an embodiment of the present invention;

FIG. 16 is an exemplary table for describing the operation of a multiplexer according to an embodiment of the present invention;

FIG. 19 is another exemplary table for describing the operation of a multiplexer according to an embodiment of the present invention;

DESCRIPTION OF THE PREFERRED EMBODIMENTS

Figure 1:
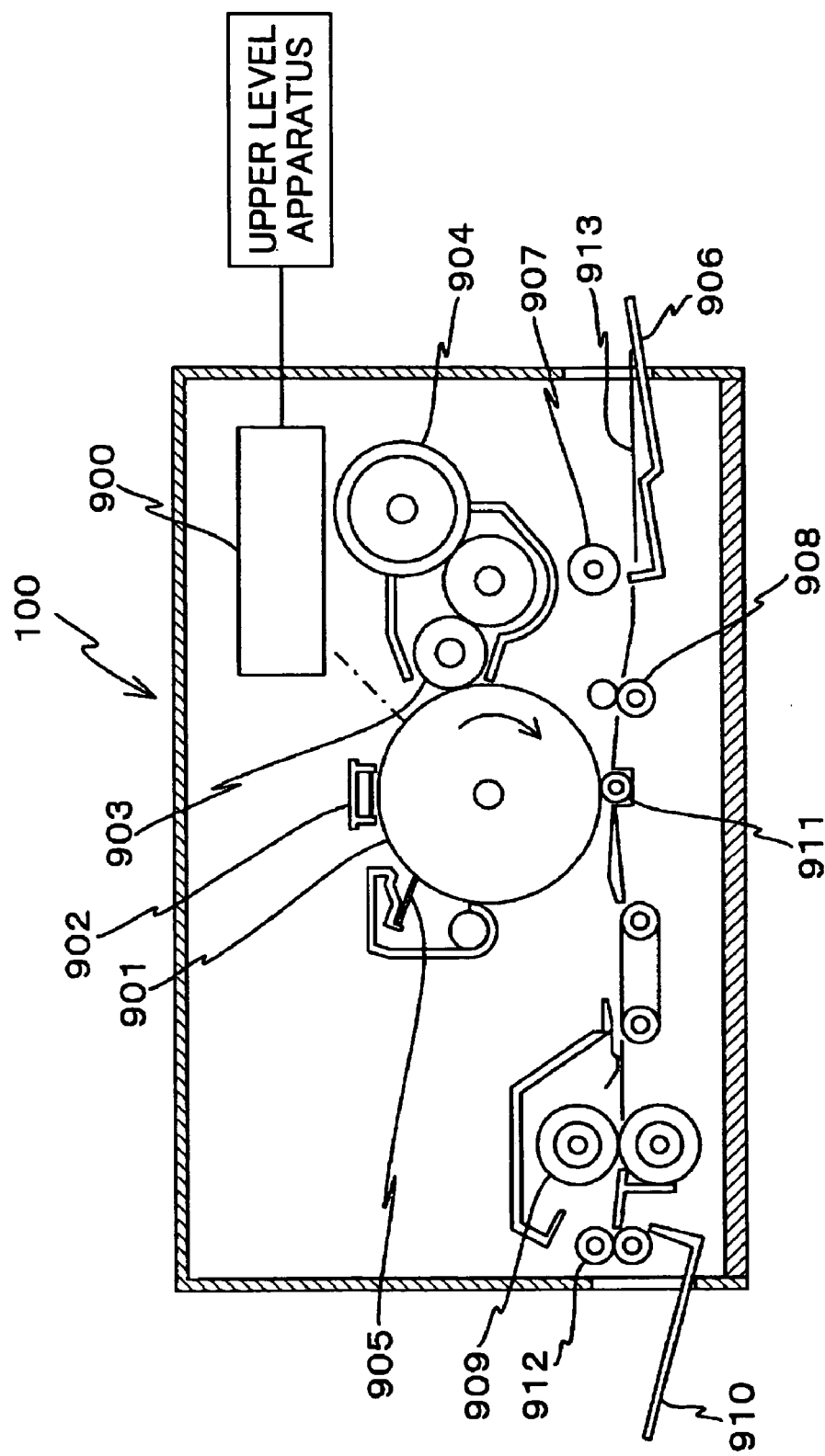
FIG. 1 is a schematic view of a laser printer (image forming apparatus) according to an embodiment of the present invention.

In the following, embodiments of the present invention are described with reference to FIGS. 1-27. FIG. 1 shows an exemplary configuration of an image forming apparatus (in this embodiment, a laser printer) 100 according to an embodiment of the present invention.

The laser printer 100 shown in FIG. 1 includes, for example, an optical scanning apparatus 900, a photoconductor drum (scanning target) 901 on which scanning is performed, a charging brush 902, a developing roller 903, a toner cartridge 904, a cleaning blade 905, a sheet feeding tray 906, a sheet feeding roller 907, a pair of resist rollers (resist roller pair) 908, a transferring roller 911, a fixing roller 909, a sheet discharging roller 912, and a sheet discharge tray 910.

The charging brush 902, the developing roller 903, the transferring roller 911, and the cleaning blade 905 are each positioned in the vicinity of the surface of the photoconductor drum 901. The charging brush 902, the developing roller 903, the transferring roller 911, and the cleaning blade 905 are arranged in this order with respect to the rotating direction of the photoconductor drum 901.

The photoconductor drum 901 has a photosensitive layer formed on its surface. The photoconductor drum 901 in this embodiment rotates in a clockwise direction (arrow direction) as shown in FIG. 1.

The charging brush 902 is for electrically charging the surface of the photoconductor drum 901.

The optical scanning apparatus 900 irradiates a light beam, being modulated in accordance with the image information from an upper level apparatus (e.g. personal computer), to the surface of the photoconductor drum 901 that is charged by the charging brush 902. Accordingly, the charge on the surface of the photoconductor drum 901 is removed at areas where the light beam is irradiated. Thereby, a latent image corresponding to the image information is formed on the surface of the photoconductor drum 901. The latent image is delivered toward the developing roller 903 along with the rotation of the photoconductor drum 901. The longitudinal direction (direction of the rotation axis) of the photoconductor drum 901 is referred to as a "scanning direction", and the rotating direction of the photoconductor drum 901 is referred to as a "sub-scanning direction". Further details of the configuration of the optical scanning apparatus 900 are described below.

The toner cartridge 904 has toner stored therein. The toner stored in the toner cartridge 904 is supplied to the developing roller 903. The amount of toner inside the toner cartridge 904 is checked (inspected), for example, when the power is turned on or when a printing operation is completed. In a case where there is only a small amount of toner remaining in the toner cartridge 904, a message requesting replacement of the toner cartridge 904 is displayed on a display part (not shown).

The toner from the toner cartridge 904 is charged and evenly thinly applied to the surface of the developing roller 903 along with the rotation of the developing roller 903. Furthermore, the developing roller 903 has applied a predetermined voltage such that electric fields of opposite direction are generated between the charged area of the photoconductor drum 901 (area to which the light beam is irradiated) and the uncharged area of the photoconductor drum (area to which the light beam is not irradiated). This voltage enables the toner on the developing roller 903 to be attached only to the surface of the charged area of the photoconductor drum 901 to which the light beam is irradiated. In other words, the developing roller 903 makes visible the image information by having toner attached to the latent image formed on the surface of the photoconductor drum 901. The latent image, having toner attached thereto, is delivered toward the direction of the transferring roller 911 along with the rotation of the photoconductor drum 901.

The sheet feeding tray 906 has recording paper (transfer medium) 913 stored therein. The sheet feeding roller 907 is provided in the vicinity of the sheet feeding tray 906. The sheet feeding roller 907 extracts the recording paper 913 sheet-by-sheet and conveys the recording paper 913 to the pair of resist rollers (resist roller pair) 908. The resist roller pair 908 is situated in the vicinity of the transferring roller 911. The resist roller pair 908 once first holds the recording paper 913 extracted by the sheet feeding roller 907 and then delivers the recording paper 913 to a space part between the photoconductor drum 901 and the transferring roller 911 in correspondence with the rotation of the photoconductor drum 901.

A voltage having an opposite polarity with respect to the toner on the surface of the photoconductor drum 901 is applied to the transferring roller 911 for electrically attracting the toner to the recording paper 913. This voltage allows the latent image on the surface of the photoconductor drum 901 to be transferred to the recording paper 913. Then, the recording paper 913 having the latent image transferred thereto is delivered to the fixing roller 909.

The fixing roller 909 applies heat and pressure to the recording paper 913. Thereby, the toner is fixed onto the recording paper 913. Then, the recording paper 913 is delivered to the sheet discharge tray 910 via the sheet discharging roller 912 and is sequentially stacked on the sheet discharge tray 910.

The cleaning blade 905 removes the toner (residual toner) remaining on the surface of the photoconductor drum 901. It is to be noted that the removed residual toner can be reused. The photoconductor drum 901 having residual toner removed from its surface returns to the original position of the charging brush 902.

Figure 2:
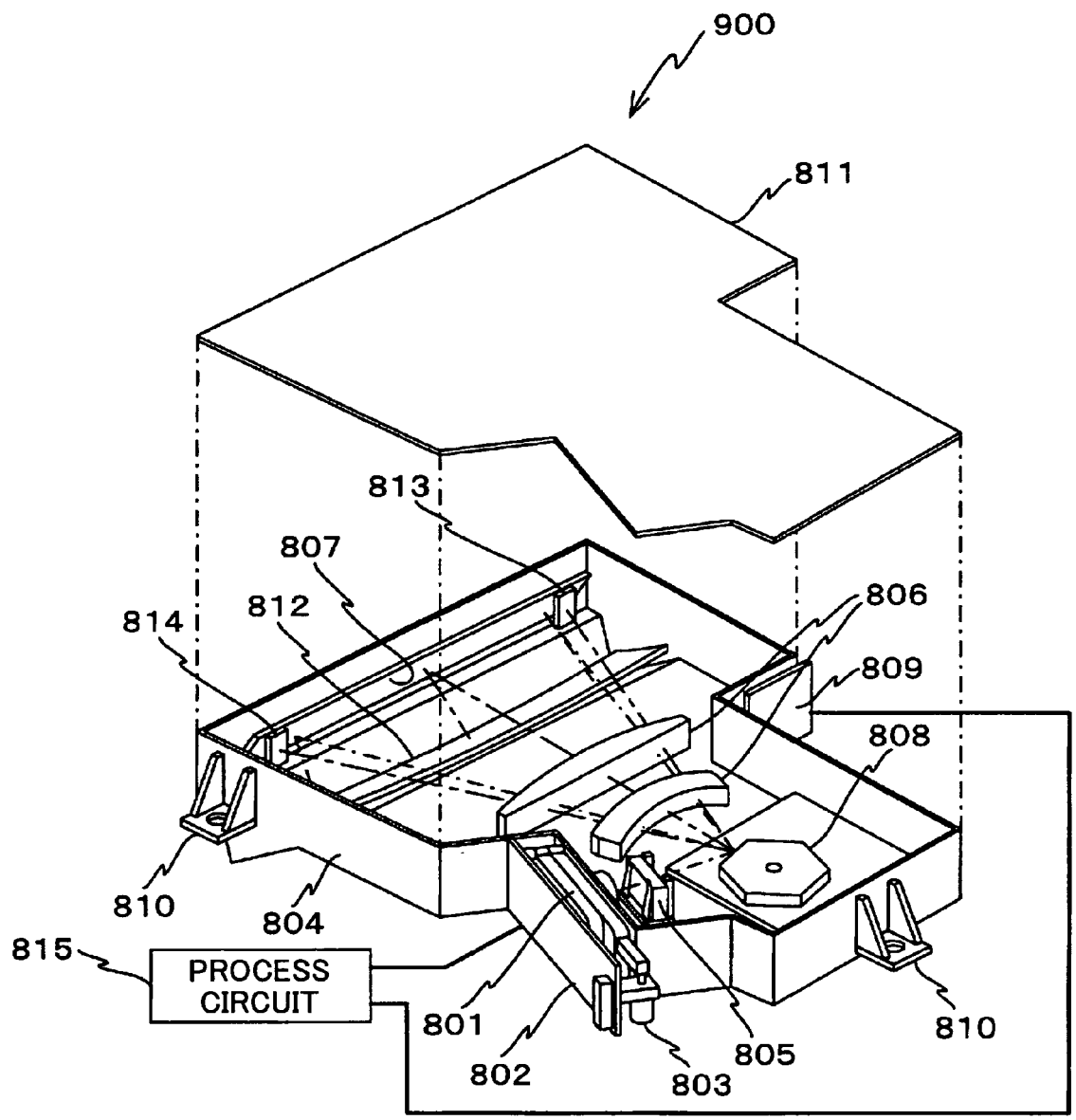
FIG. 2 is a schematic view showing an embodiment of an optical scanning apparatus included in the image forming apparatus of FIG. 1 (Part 1)
Figure 3:
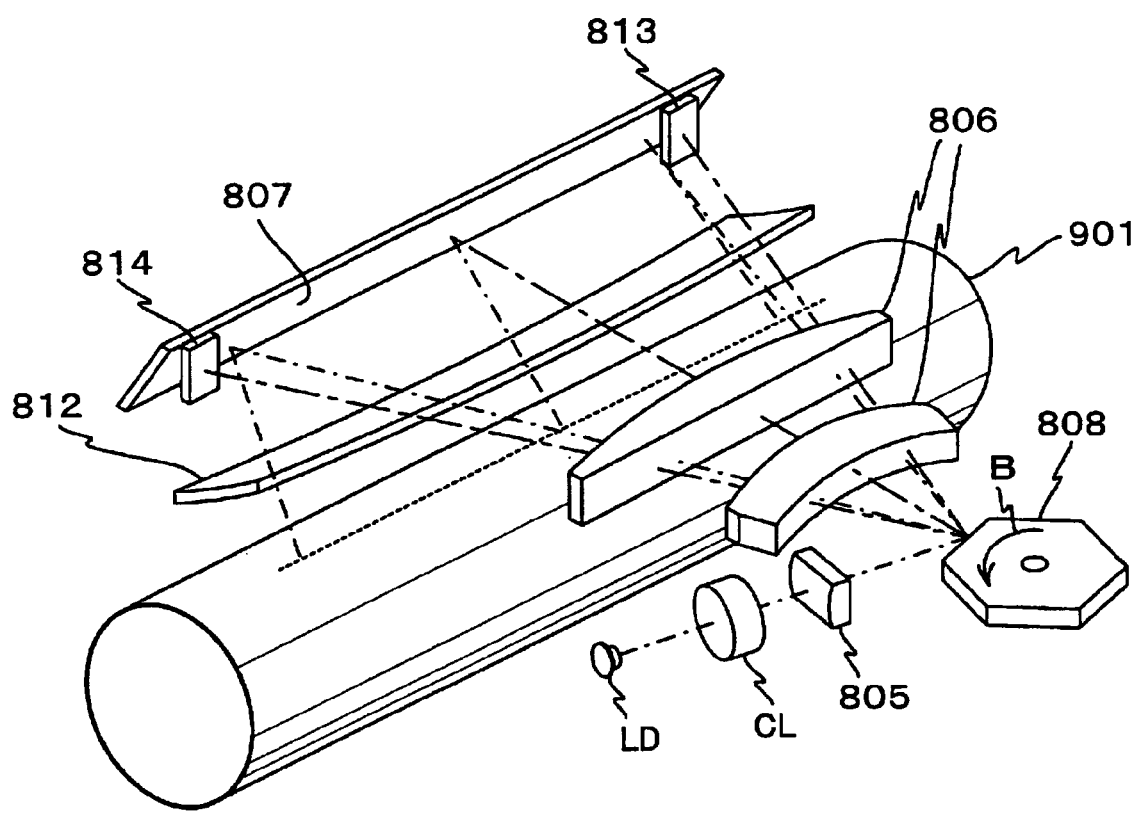
FIG. 3 is another schematic view showing an embodiment of an optical scanning apparatus included in the image forming apparatus of FIG. 1 (Part 2)

Next, an exemplary configuration of the above-described optical scanning apparatus 900 is described with reference to FIGS. 2 and 3.

The optical scanning apparatus 900 includes, for example, a light source unit 801 having a semiconductor laser LD as its light source, a collimator lens CL, a cylinder lens 805, a polygon mirror 808, a polygon motor (not shown) for rotating the polygon mirror 808, an fθ lens 806, a return mirror 807, a toroidal lens 812, two photosensitive elements 813, 814, two printed boards 802, 809, a processing circuit 815, and an optical housing 804. The optical system having the collimator lens CL, the cylinder lens 805, the polygon mirror 808, the fθ lens 806, the return mirror 807, and the toroidal lens 812 situated on the optical path between the light source unit 801 and the photoconductor drum 901 may hereinafter be also referred to as "scanning optical system".

The light source unit 801, which has the printed board 802 mounted on its rear side, is pressed against the wall of the optical housing 804 by a spring member (not shown). The position of the light source unit 801 pressed against the wall of the optical housing 804 can be adjusted by using an adjustment screw 803. Accordingly, the orientation of the maximum output strength of the laser beam emitted from the semiconductor laser LD can be adjusted. The adjustment screw is fastened to a projecting part provided to the wall of the optical housing 804. In the optical housing 804, the collimator lens CL, the cylinder lens 805, the polygon mirror 808, the polygon motor (not shown), the fθ lens 806, the return mirror 807, the toroidal lens 812, and the two photosensitive elements 813, 814 are each fixed and supported at a predetermined position.

Furthermore, in the same manner as the light source unit 801, the printed board 809 is mounted to the wall of the optical housing 804 from the outside. The upper part of the optical housing 804 is sealed by a cover 811. Furthermore, the optical housing 804 has plural attachment parts 810 projecting from its walls. The attachment parts 810 are to be fastened to a frame member of the laser printer 100 by screws.

The collimator lens CL converts (collimates) the laser beam emitted from the semiconductor laser LD to a substantially parallel ray. The cylinder lens 805 couples the light from the collimator lens CL.

The polygon mirror 808 includes plural deflection faces for deflecting the light from the cylinder lens 805 at an equal speed and equal angle within a predetermined angle range. The fθ lens 806 converts the light deflected by the polygon mirror 808 at an equal speed. The return mirror 807 bends the optical path of the light from the fθ lens 806. The toroidal lens 812 condenses the light from the return mirror 807 onto the surface of the photoconductor drum 901, to thereby form a beam spot on the photoconductor drum 901.

Next, the operation of the optical scanning system according to an embodiment of the present invention is described. The light beams irradiated from the semiconductor laser LD are first converged to the vicinity of the deflection face of the polygon mirror 808 via the collimator lens CL and the cylinder lens 805. The polygon mirror 808 is rotated at a predetermined speed in direction B (see FIG. 3) by the polygon motor (not shown). The light beam converged to the vicinity of the deflection face of the polygon mirror is deflected along with the rotation of the polygon mirror 800. The deflected light beam transmits through the fθ lens 806 and is converted to a light beam for scanning the return mirror 807 in the longitudinal direction within a predetermined angle range at a constant speed. Then, the light beam reflected from the return mirror 807 is scanned across the surface of the photoconductor drum 901 via the toroidal lens 812. That is, the beam spot formed on the surface of the photoconductor drum 901 moves in the scanning direction. In scanning the light beam in the scanning direction, a single scan from an initial scanning position to a terminal scanning position is also hereinafter referred to as a "single line scan".

The return mirror 807 has two photosensitive elements 813, 814 provided on respective ends in the scanning direction for detecting the initiation (start) and termination (end) of the single line scan. In this embodiment, the photosensitive elements 813, 814 are positioned so that the photosensitive element 813 receives the light beam deflected from the polygon mirror 808 before the execution of the single line scan and the photosensitive element 814 receives the light beam after the execution of the single line scan. Each photosensitive element 813, 814 outputs a signal(s) (photoelectric conversion signal) in accordance with the amount of received light.

Figure 4:
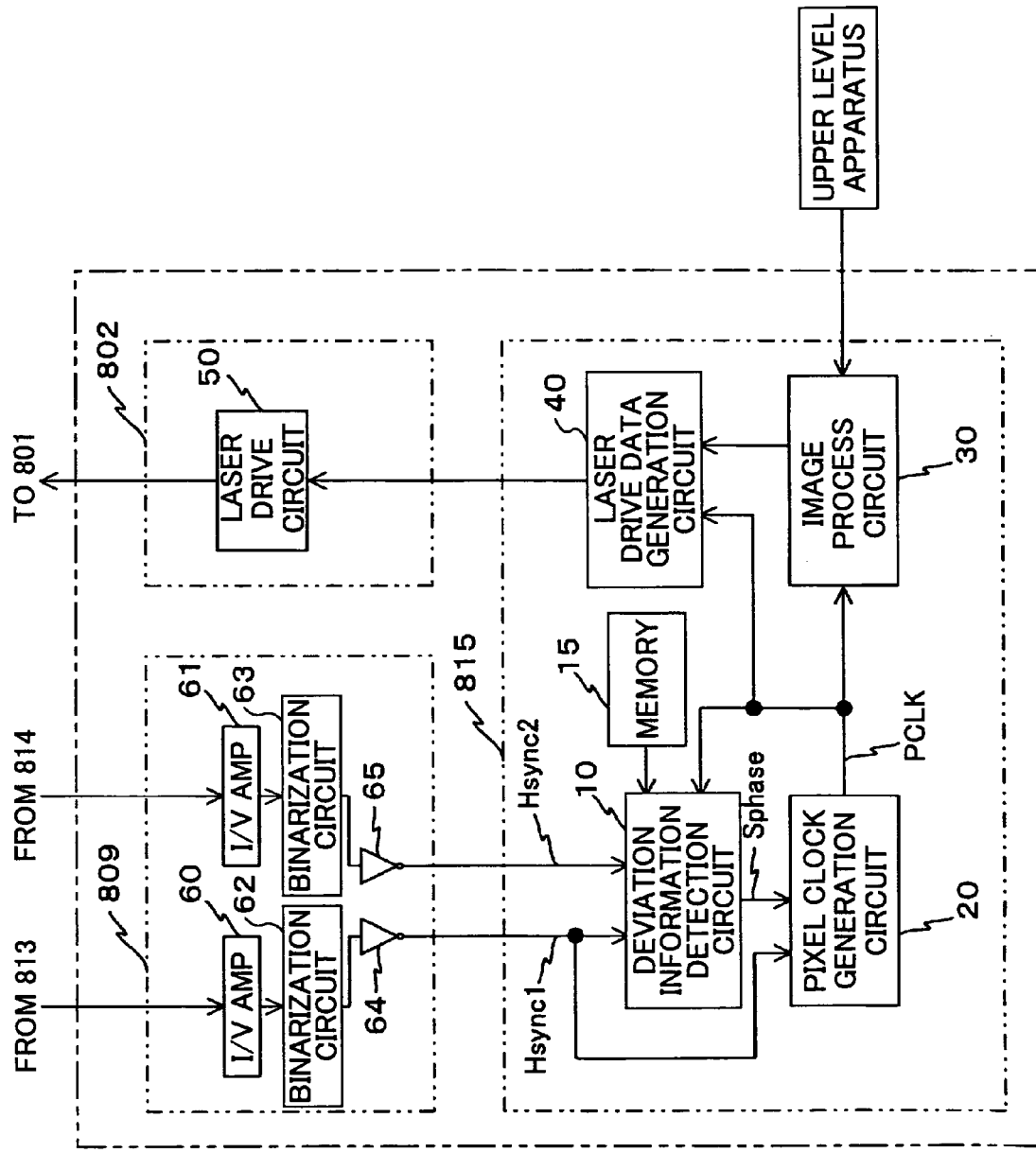
FIG. 4 is a circuit diagram for describing various circuits and process circuits mounted on a printed board included in the optical scanning apparatus shown in FIG. 2.
Figure 6:
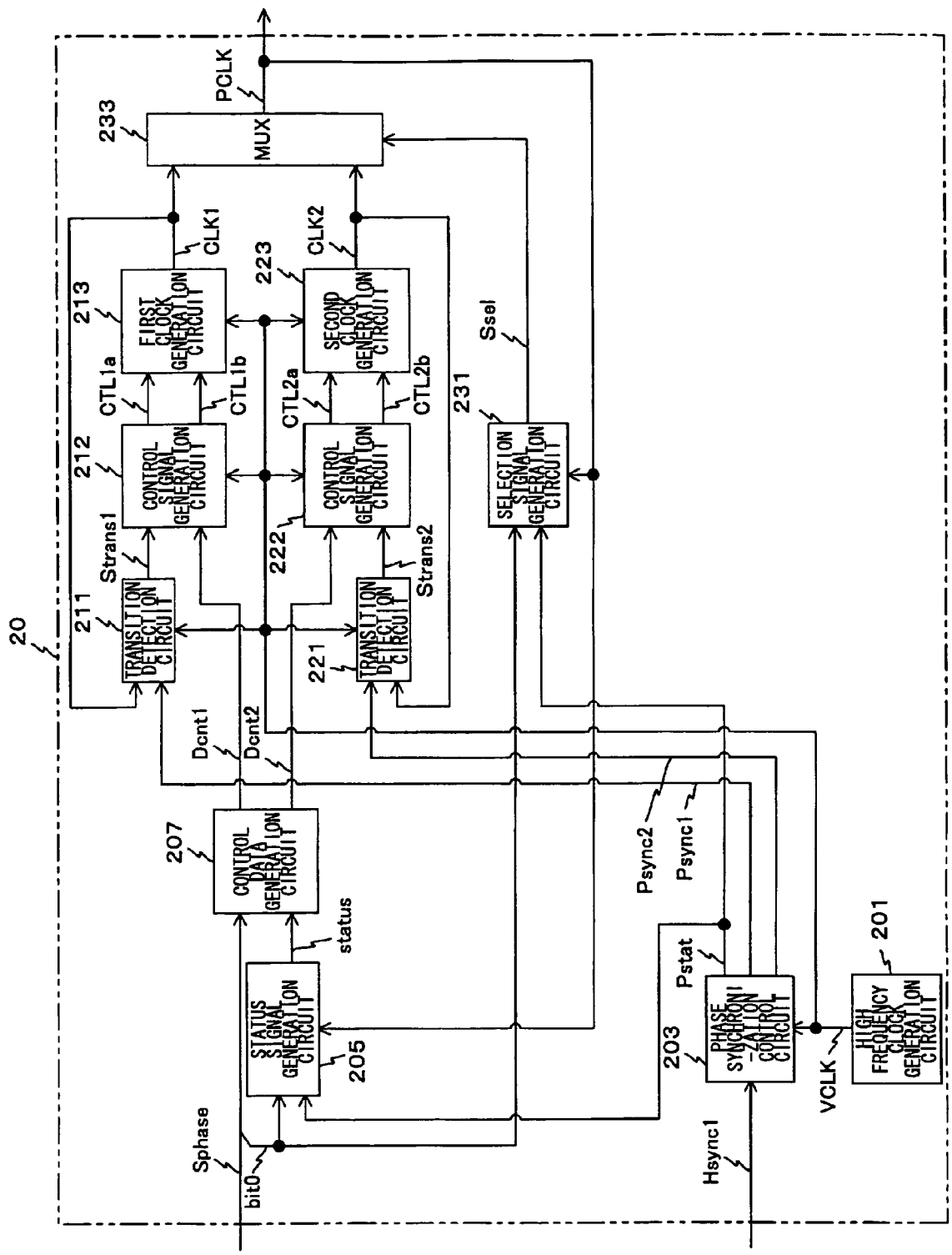
FIG. 6 is a circuit diagram for describing a configuration of a pixel clock generation circuit according to an embodiment of the present invention.

As shown in FIG. 4, the printed board 809 includes, for example, two I/V amps 60, 61, two binarization circuits 62, 63, and two inverters 64, 65.

The I/V amp 60 converts the photoelectric conversion signals from the photosensitive element 813 to voltage signals and amplifies the voltage signals with a predetermined gain. The I/V amp 61 converts the photoelectric conversion signals from the photosensitive element 814 to voltage signals and amplifies the voltage signals with a predetermined gain.

The binarization circuit 63 binarizes the signals output from the I/V amp 60. The binarization circuit 62 binarizes the signals output from the I/V amp 61.

Figure 8:
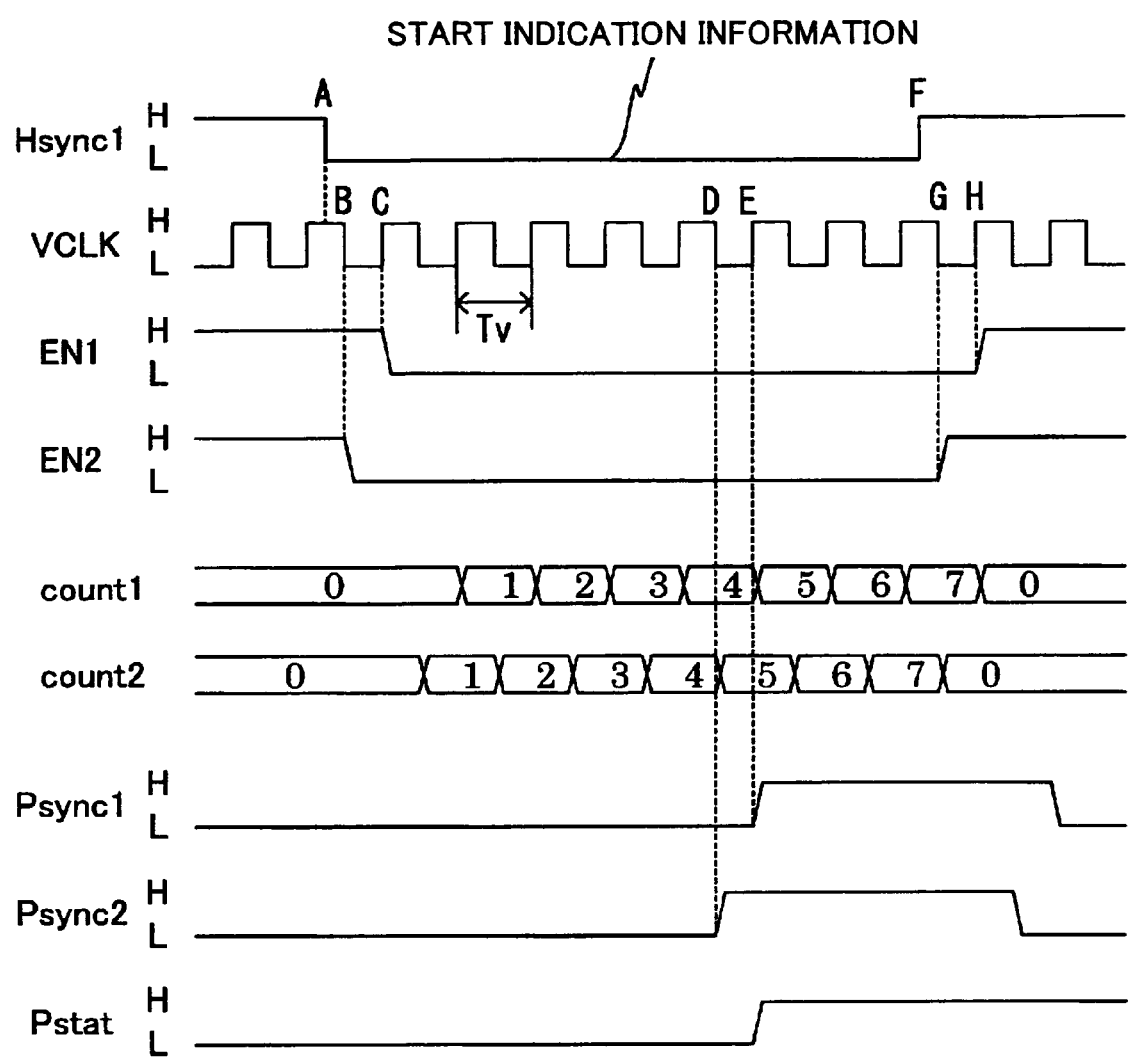
FIG. 8 is an exemplary timing chart for describing the operation of the phase synchronization control circuit according to an embodiment of the present invention (Part 1)
Figure 9:
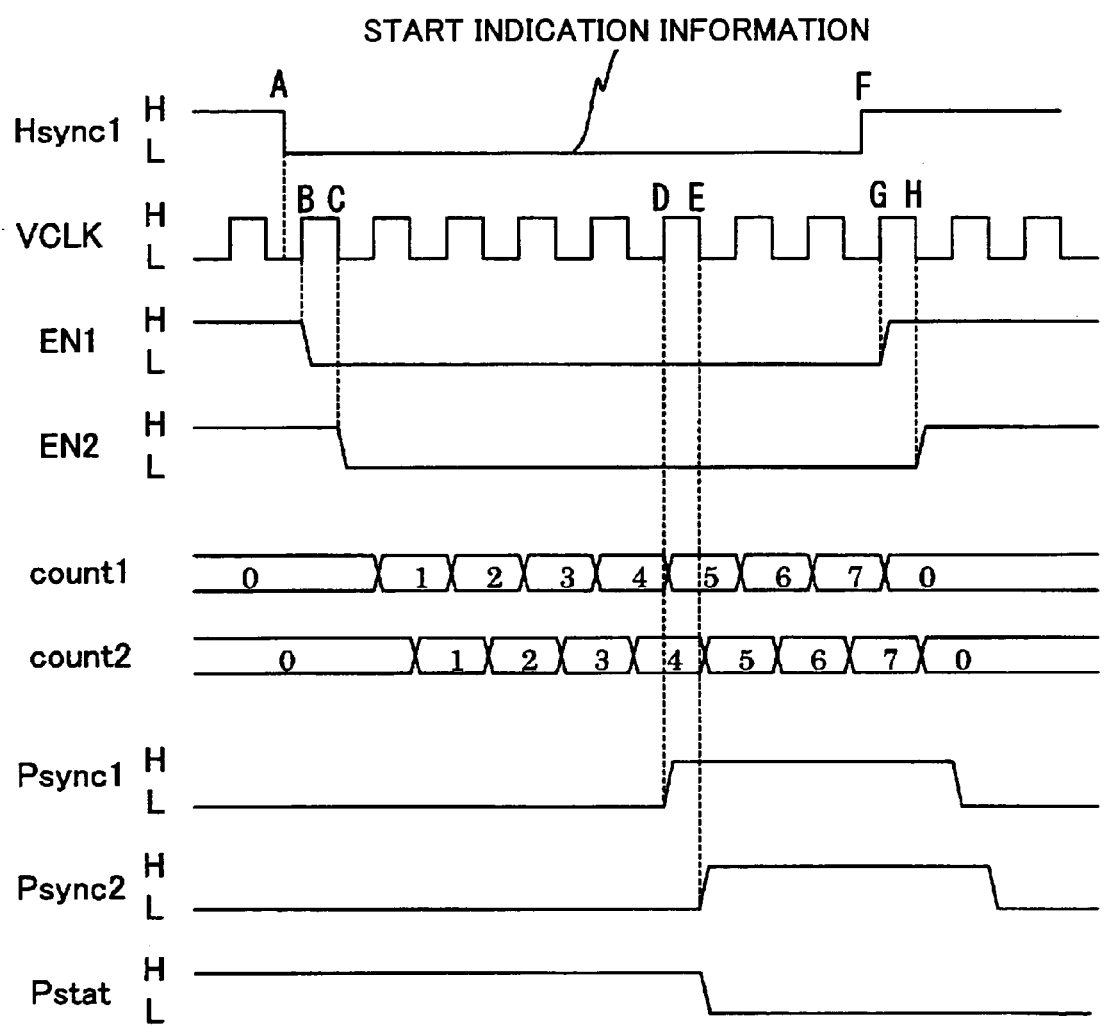
FIG. 9 is an exemplary timing chart for describing the operation of the phase synchronization control circuit according to an embodiment of the present invention (Part 2)
Figure 10:
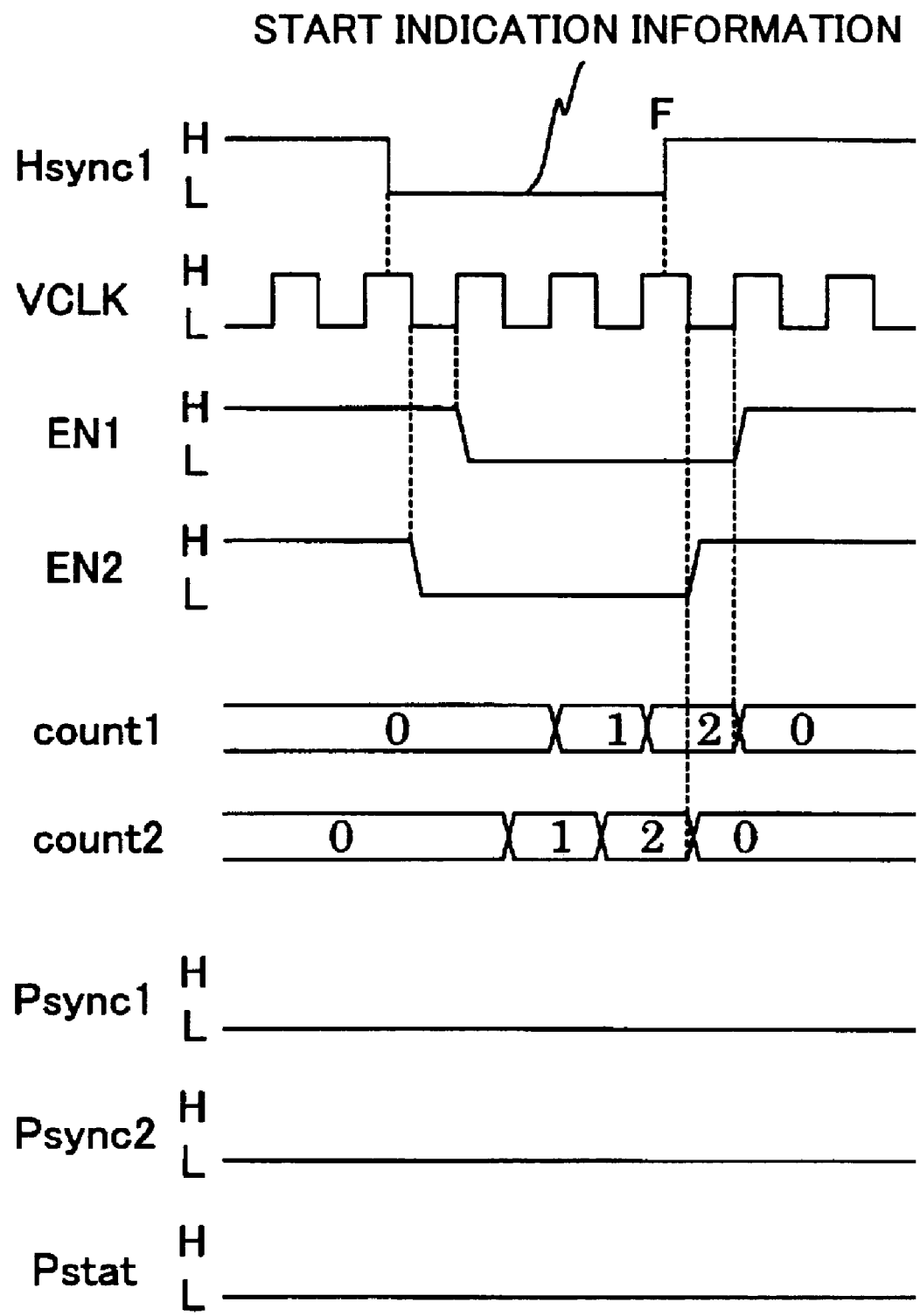
FIG. 10 is an exemplary timing chart for describing the operation of the phase synchronization control circuit according to an embodiment of the present invention (Part 3)

The inverter 64 inverts the signals output from the binarization circuit 62 and outputs the inverted signals as first horizontal synchronizing signals Hsync1. The inverter 65 inverts the signals output from the binarization circuit 63 and outputs the inverted signals as second horizontal synchronizing signals Hsync2. The first horizontal synchronizing signal Hsync1 changes from "H (high level)" to "L (low level)" when a light beam is received by the photosensitive element 813. The second horizontal synchronizing signal Hsync2 changes from "H (high level)" to "L (low level)" when a light beam is received by the photosensitive element 814. Accordingly, as shown in FIGS. 8-10, the part where the signal level of the first horizontal synchronizing signal Hsync1 is "L" serves as information indicating the start of the single line scan. Both the first horizontal synchronizing signal Hsync1 and the second horizontal synchronizing signal Hsync2 are output to a process circuit 815.

As shown in FIG. 4, the printed circuit 802 includes, for example, a laser drive circuit 50. The laser drive circuit 50 converts modulation data (described below) from the process circuit 815 into corresponding drive signals and outputs the drive signals to the light source unit 801. The drive signals are supplied to the semiconductor laser LD in the light source unit 801.

As shown in FIG. 4, the process circuit 815 includes, for example, a deviation information detection circuit 10, a memory 15, a pixel clock generation circuit (clock signal generation circuit) 20, an image process circuit 30, and a laser drive data generation circuit 40.

Based on the first horizontal synchronizing signal Hsync1 and the second horizontal synchronizing signal Hsync2, the deviation information detection circuit 10 detects position deviation information of each line. In this embodiment of the present invention, the deviation information detection circuit 10 calculates the time spent for scanning a single line by referring to the first horizontal synchronizing signal Hsync1 and the second horizontal synchronizing signal Hsync2 and compares the calculated time with a predetermined reference time (hereinafter also referred to as "single line scan reference time"). Based on the difference obtained from this comparison (hereinafter referred to as "scan time difference"), the position deviation information is obtained. Then, the deviation information detection circuit 10 generates phase data Sphase for correcting position deviation (if any) based on the position deviation information. In this embodiment of the present invention, "position deviation" refers to a case where the latent image (more specifically, the pixels of the latent image) formed on the surface of the photoconductor drum 901 deviates from its expected position with respect to the scanning direction. The position deviation may be caused by, for example, a scanning irregularity due to the characteristics of the fθ lens 806, inclination of the deflection/reflection face of the polygon mirror 808, inconsistency of the distance from the rotation axis of the deflection/reflection face, irregularity in the rotation of the polygon mirror 808, and changes in the wavelength of the laser beam from the semiconductor laser LD.

In this embodiment of the present invention, based on plural scan time differences (obtained by experiments performed beforehand), position deviation of each pixel is calculated in correspondence with each of the scan time differences. Based on the results of the calculations, a map indicating the pixel(s) for changing the phase in correspondence with each of the obtained scan time differences and the amount of the change is generated. The map for each scan time difference is stored as a position deviation information table in the memory 15.

Accordingly, the deviation information detection circuit 10 refers to the position deviation information table in the memory 15, extracts a map in accordance with an obtained scan time difference, and generates a phase data item(s) Sphase based on the map. In addition to referring to the scan time difference obtained from a recent (immediate) single line scan, the map may also be extracted by referring to past history information of one or more scan time differences.

In one example, the phase data item Sphase includes three bits (bit 0 ($b_0$), bit 1 ($b_1$), bit 2 ($b_2$)) as shown in FIG. 5. The phase data item Sphase corresponds to a phase shift amount of a pixel clock signal (described below). The generated phase data item Sphase is output to the pixel clock generation circuit 20 in synchronization with a pixel clock signal.

As shown in FIG. 5, a phase data item Sphase "000" corresponds to a shift amount of "0", a phase data item Sphase "001" corresponds to a shift amount of "+1/16", a phase data item Sphase "010" corresponds to a shift amount of "+2/16", a phase data item Sphase "011" corresponds to a shift amount of "+3/16", a phase data item Sphase "111" corresponds to a shift amount of "−1/16", a phase data item Sphase "110" corresponds to a shift amount of "−2/16", and a phase data item Sphase "101" corresponds to a shift amount of "−3/16". It is to be noted that the symbol "+" of the shift amount indicates that the clock width of a pixel clock signal is extended with respect to a reference cycle, and the symbol "−" of the shift amount indicates that the clock width of a pixel clock signal is shortened with respect to a reference cycle.

The pixel clock generation circuit 20 generates a pixel clock signal (clock signal used when scanning a light beam from a light source to a scan target) PCLK based on the first horizontal synchronizing signal Hsync1 and the phase data item Sphase.

The pixel clock generation circuit 20 according to an embodiment of the present invention includes, for example, a high frequency clock generation circuit 201 (see FIG. 6), a phase synchronization control circuit 203, a status signal generation circuit 205, a control data generation circuit 207, first and second transition detection circuits 211, 221, first and second control signal generation circuits 212, 222, first and second clock generation circuits 213, 223, a selection signal generation circuit 231, and a multiplexer 233.

The high frequency clock generation circuit 201 generates a high frequency clock signal VCLK which serves as a reference signal. In this embodiment of the present invention, a reference cycle of a pixel clock signal PCLK (cycle of a pixel clock signal when the phase shift is not executed, indicated as "Tp") corresponds to eight times of the cycle of the high frequency clock signal VCLK (indicated as "Tv"). In the reference cycle according to this embodiment of the present invention, the duty ratio is 50%.

The phase synchronization control circuit 203 generates a phase status signal Pstat and two phase synchronization signals Psyn1, Psyn2. The generated phase status signal Pstat is output to the status signal generation circuit 205 and the selection signal generation circuit 231. The generated phase synchronization signal Psync1 is output to the transition detection circuit 211. The generated phase synchronization signal Psync2 is output to the transition detection circuit 221.

Figure 7:
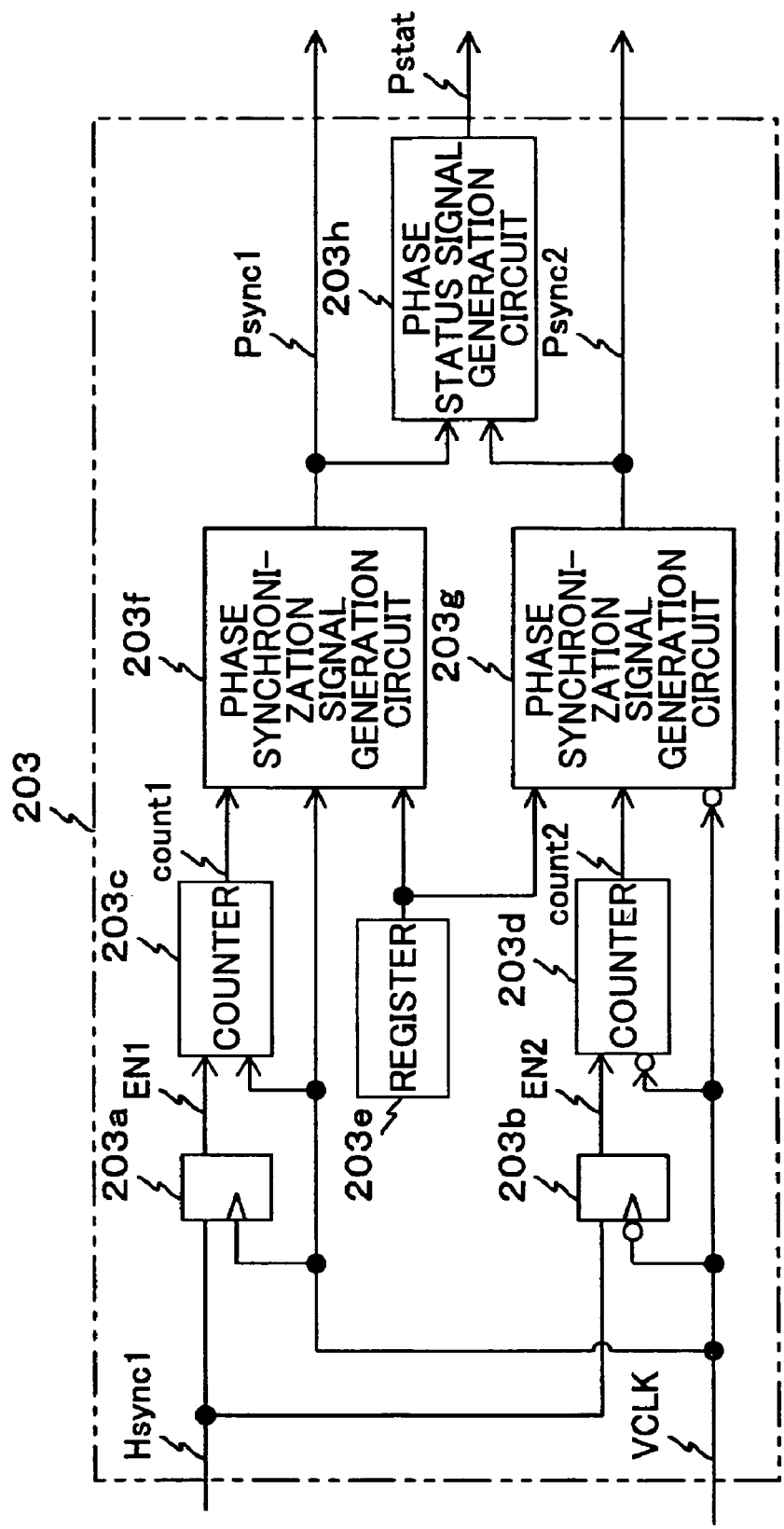
FIG. 7 is a circuit diagram for describing a phase synchronization control circuit according to an embodiment of the present invention.

As shown in FIG. 7, the phase synchronization control circuit 203 according to an embodiment of the present invention includes, for example, two flip-flops 203a, 203b, two counters 203c, 203d, a register 203e, two phase synchronization signal generation circuits 203f, 203g, and a phase status signal generation circuit 203h.

The flip-flop 203A latches the first horizontal synchronizing signal Hsync1 at the rise of the high frequency clock signal VCLK and generates a first enable signal EN1. The enable signal EN1 is output to the counter 203c.

The flip-flop 203B latches the second horizontal synchronizing signal Hsync2 at the drop of the high frequency clock signal VCLK and generates a second enable signal EN2. The enable signal EN2 is output to the counter 203d.

The counter 203c performs a counting operation of counting (counting up) count values at the rise of the high frequency clock signal VCLK when the first enable signal EN1 is "L (low level)". The counter 203c resets the count value to "0" at the rise of the high frequency clock signal VCLK when the first enable signal EN1 changes from "L (low level)" to "H (high level)". The count value is output as a first count signal (indicated as "count1") to the phase synchronization signal generation circuit 203f.

The counter 203d performs a counting operation of counting (counting up) count values at the drop of the high frequency clock signal VCLK when the second enable signal EN2 is "L (low level)". The counter 203d resets the count value to "0" at the drop of the high frequency clock signal VCLK when the second enable signal EN2 changes from "L (low level)" to "H (high level)". The count value(s) is output as a second count signal (indicated as "count2") to the phase synchronization signal generation circuit 203g.

The phase synchronization signal generation circuit 203f compares the count value obtained from the first count signal count1 with a reference count stored in the register 203e. If the count value obtained from the first count signal count1 matches the reference count, the phase synchronization signal generation circuit 203f outputs a first phase synchronization signal Psync1 which becomes a "H" (high level) signal in synchronization with the rise of the high frequency clock signal VCLK. The phase synchronization signal generation circuit 203g compares the count value obtained from the second count signal count2 with a reference count stored in the register 203e. If the count value obtained from the second count signal count2 matches the reference count, the phase synchronization signal generation circuit 203g outputs a second phase synchronization signal Psync2 which becomes a "H" (high level) signal in synchronization with the drop of the high frequency clock signal VCLK.

The phase status signal generation circuit 203h generates a phase status signal Pstat based on the first and second phase synchronization signals Psync1, Psync2. In this embodiment of the present invention, the phase status signal Pstat is output as a "L" (low level) when the timing of the rise of the first phase synchronization signal Psync1 is earlier than the timing of the rise of the second phase synchronization signal Psync2, and is output as a "H" (high level) when the timing of the rise of the second phase synchronization signal Psync 2 is earlier than the timing of the rise of the first phase synchronization signal Psync1.

The operation of the above-described phase synchronization control circuit 203 is described with reference to the timing charts shown in FIGS. 8-10. In this embodiment of the present invention, the reference count stored in the register 203e is "4". That is, the reference count corresponds to a value which is half (½) of the reference cycle Tp of the pixel clock signal PCLK.

As shown in FIG. 8, in a case where the first horizontal synchronizing signal Hsync is changed from "H" to "L" (timing A in FIG. 8), the second enable signal EN2 becomes "L" when the high frequency clock signal VCLK drops from "H" to "L" (timing B in FIG. 8) and then the first enable signal EN1 becomes "L" when the high frequency clock signal VCLK rises from "L" to "H" (timing C in FIG. 8). Accordingly, the counter 203d starts the counting operation at the drop of the high frequency clock signal VCLK, and the counter 203c starts the counting operation at the rise of the high frequency clock signal VCLK. In this embodiment of the present invention, the counting operation by the counter 203d is started before the counting operation by the counter 203c. Furthermore, when the count value obtained from the second count signal count2 becomes "4", the phase synchronization signal generation circuit 203g generates a second phase synchronization signal Psync2 of a high level (H) at the drop of the high frequency clock signal (timing D in FIG. 8). Furthermore, when the count value obtained from the first count signal count1 becomes "4" the phase synchronization signal generation circuit 203f generates the first phase synchronization signal Psync1 of a high level (H) at the rise of the high frequency clock signal (timing E in FIG. 8). In this embodiment of the present invention, the second phase synchronization signal Psync2 becomes a high level (H) before the first phase synchronization signal Psync1 becomes a high level (H). The phase status signal Pstat becomes a high level (H) at the same timing that the first phase synchronization signal Psync1 becomes a high level (timing E in FIG. 8). As exemplarily shown in FIG. 8, in a case where the first horizontal synchronizing signal Hsync is changed from "L" to "H" (timing F in FIG. 8), the second enable signal EN2 of a high level (H) is generated at the drop of a following high frequency clock signal(s) VCLK (timing G in FIG. 8) when the high frequency clock signal VCLK is a high level (H) and the first enable signal EN1 of a high level (H) is generated at the rise of the high-frequency clock signal VCLK (timing H in FIG. 8) when the high frequency clock signal VCLK is a low level (L).

As shown in FIG. 9, in a case where the first horizontal synchronizing signal Hsync is changed from "H" to "L" (timing A in FIG. 9), the first enable signal EN1 becomes "L" when the high frequency clock signal VCLK rises from "L" to "H" (timing B in FIG. 9) and then the second enable signal EN2 becomes "L" when the high frequency clock signal VCLK drops from "H" to "L" (timing C in FIG. 9). Accordingly, the counter 203c starts the counting operation at the rise of the high frequency clock signal VCLK, and the counter 203d starts the counting operation at the drop of the high frequency clock signal VCLK. In this embodiment of the present invention, the counting operation by the counter 203c is started before the counting operation by the counter 203d. Furthermore, when the count value obtained from the first count signal count1 becomes "4", the phase synchronization signal generation circuit 203f generates a first phase synchronization signal Psync1 of a high level (H) at the rise of the high frequency clock signal (timing D in FIG. 9). Furthermore, when the count value obtained from the second count signal count2 becomes "4" the phase synchronization signal generation circuit 203g generates the second phase synchronization signal Psync2 of a high level (H) at the drop of the high frequency clock signal (timing E in FIG. 9). In this embodiment of the present invention, the first phase synchronization signal Psync1 becomes a high level (H) before the second phase synchronization signal Psync2 becomes a high level (H). The phase status signal Pstat becomes a low level (L) at the timing when the second phase synchronization signal Psync2 becomes a high level. As exemplarily shown in FIG. 9, in a case where the first horizontal synchronizing signal Hsync is changed from "L" to "H" (timing F in FIG. 9), the first enable signal EN1 of a high level (H) is generated at the rise of a following high frequency clock signal(s) VCLK (timing G in FIG. 9) when the high frequency clock signal VCLK is a low level (H) and the second enable signal EN2 of a high level (H) is generated at the drop of the high frequency clock signal VCLK (timing H in FIG. 9) when the high frequency clock signal VCLK is a high level (H).

As exemplarily shown in FIG. 10, in a case where the count values obtained from each of the counters 203c, 203d are less than "4" ("2" in the example shown in FIG. 10), neither the first phase synchronization signal Psync1 nor the second phase synchronization signal Psync2 change when the first horizontal synchronizing signal Hsync1 changes from "L" to "H" (timing F in FIG. 10). Thus, in such a case, the phase status signal Pstat also does not change. In other words, in a case where the first horizontal synchronizing signal Hsync1 is "L" (low level) for a short period, there is no change in any one of the phase status signal Pstat, the first phase synchronization signal Psync1, or the second phase synchronization signal Psync2. Therefore, even in a case where factors such as noise cause the first horizontal synchronizing signal Hsync1 to temporarily change to "L" (low level), such change has no effect on the signals output from the phase synchronization control circuit 203.

Figure 11:
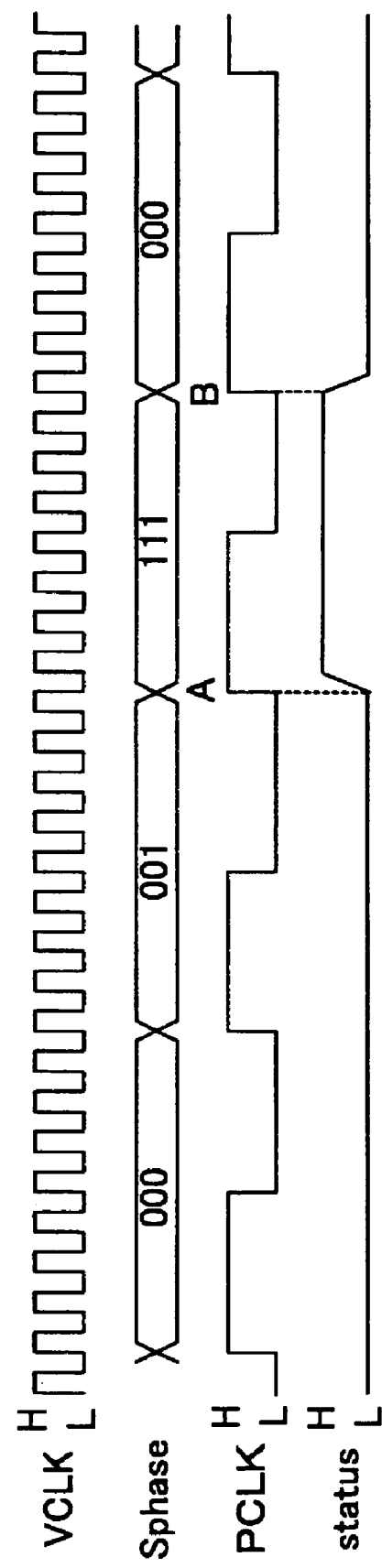
FIG. 11 is an exemplary timing chart for describing the operation of a status signal generation circuit according to an embodiment of the present invention.

Returning to FIG. 6, the status signal generation circuit 205 generates a status signal (indicated as "status" in FIG. 6) based on the bit 0 of the phase data item Sphase, the phase status signal Pstat, and the pixel clock signal PCLK (output signal from multiplexer 233). The generated status signal is output to the control data generation circuit 207. More specifically, the status signal generation circuit 205 initializes the level of the status signal to "L" when the phase status signal Pstat changes from "L" to "H". The status signal is set in accordance with the change of signal level of the phase status signal Pstat. For example, as shown in FIG. 11, the status signal changes in synchronization with the timing of the rise of the pixel clock signal PCLK (timing A, B in FIG. 11) in a case where the bit 0 of the phase data item Sphase is "1". The level of the status signal is initialized to "H" when the phase status signal Pstat changes from "H" to "L".

The control data generation circuit 207 generates first and second control data items Dcnt1, Dcnt2 based on the phase data item Sphase and the status signal. The generated first control data item Dcnt1 is output to the control signal generation circuit 212, and the generated second control data item Dcnt2 is output to the control signal generation circuit 222. For example, as shown in FIG. 12, the first and second control data items Dcnt1 and Dcnt2 are both "010" regardless of the value of the status signal in a case where the phase data item Sphase is "000". In a case where the phase data item Sphase is "001", the first control data item Dcnt1 is "010" and the second control data item Dcnt2 is "001" when the status signal is "0", but the first control data item Dcnt1 is "001" and the second control data item Dcnt2 is "010" when the status signal is "1". In a case where the phase data item Sphase is "010", the first and second control data items Dcnt1 and Dcnt2 are both "001" regardless of the status signal. In a case where the phase data item Sphase is "011", the first control data item Dcnt1 is "001" and the second control data item Dcnt2 is "000" when the status signal is "0", but the first control data item Dcnt1 is "000" and the second control data item Dcnt2 is "001" when the status signal is "1". In a case where the phase data item Sphase is "111", the first control data item Dcnt1 is "011" and the second control data item Dcnt2 is "010" when the status signal is "0", but the first control data item Dcnt1 is "010" and the second control data item Dcnt2 is "011" when the status signal is "1". In a case where the phase data item Sphase is "110", the first and second control data items Dcnt1, Dcnt2 are both "011" regardless of the status signal. In a case where the phase data item Sphase is "101", the first control data item Dcnt1 is "100" and the second control data item Dcnt2 is "011" when the status signal is "0", but the first control data item Dcnt1 is "011" and the second control data item Dcnt2 is "100" when the status signal is "1".

Figure 13:
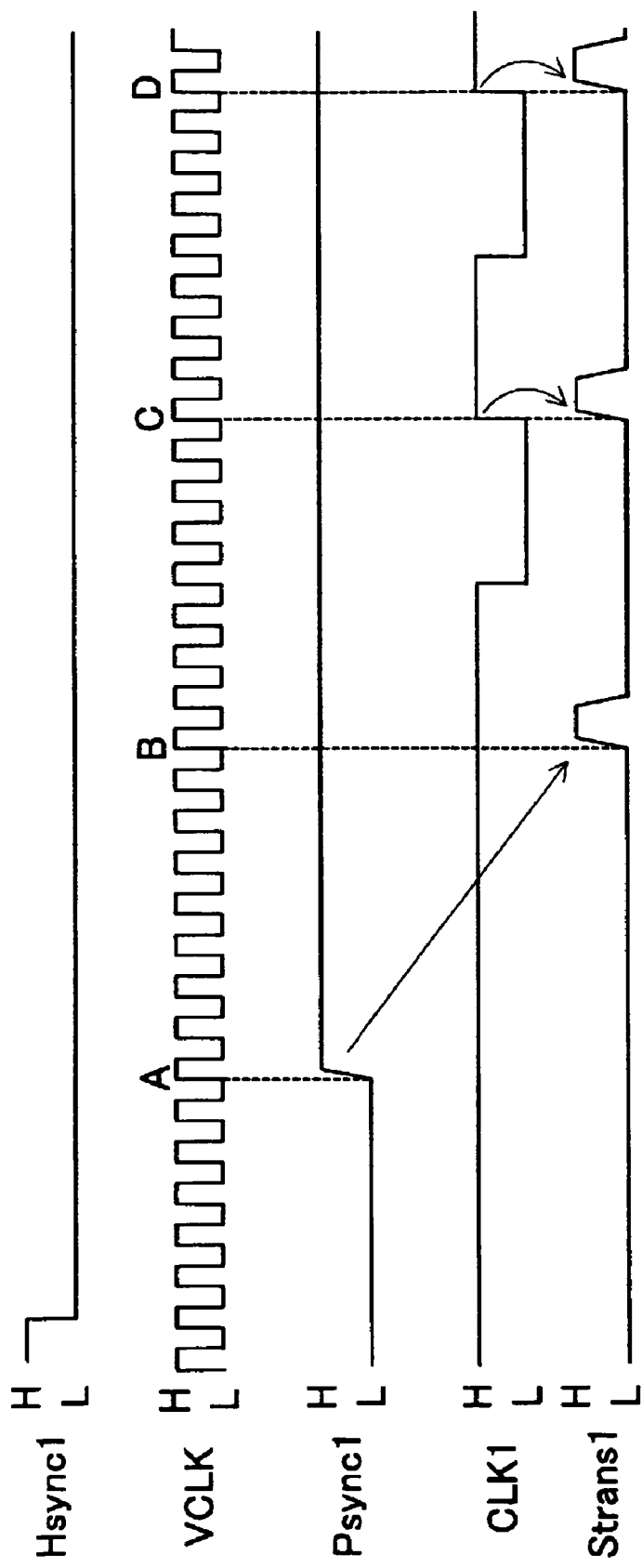
FIG. 13 is an exemplary timing chart for describing the operation of a first transition detection circuit according to an embodiment of the present invention.

Returning to FIG. 6, the first transition detection circuit 211 generates a first detection signal Strans1 based on the high frequency clock signal VCLK, the first phase synchronization signal Psync1, and the first clock signal CLK1 (signal output from first clock generation circuit 213). The generated first detection signal Strans1 is output to the first control signal generation circuit 212. For example, as shown in FIG. 13, the first transition detection circuit 211 operates at the rise of the high frequency clock signal VCLK. When the first transition detection circuit 211 detects the rise of the first phase synchronization signal Psync1 (timing A in FIG. 13), the first transition detection circuit 211 outputs a pulse signal having a length substantially equal to a single clock width of a high frequency clock signal VCLK at a timing after eight clock outputs of the high frequency clock signal VCLK (timing B in FIG. 13). Then, when the first transition detection circuit 211 detects the rise of the first clock signal CLK1 (timings C and D in FIG. 13), the first transition detection 211 outputs a pulse signal having a length substantially equal to a single clock width (Tv) of a high frequency clock signal VCLK. The eight clock outputs are substantially equal to the signal delay time of the first transition detection circuit 211.

Figure 14:
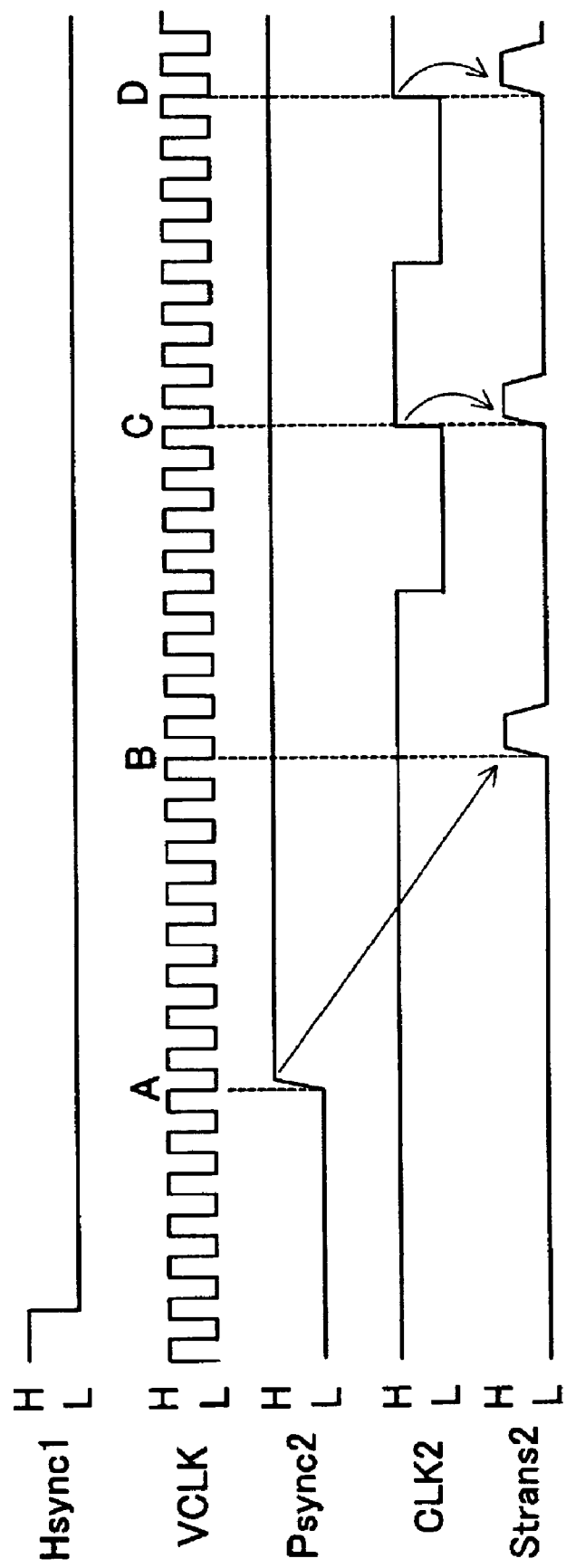
FIG. 14 is an exemplary timing chart for describing the operation of a second transition detection circuit according to an embodiment of the present invention.

The second transition detection circuit 221 generates a second detection signal Strans2 based on the high frequency clock signal VCLK, the second phase synchronization signal Psync2, and the second clock signal CLK2 (signal output from the second clock generation circuit 223). The generated second detection signal Strans2 is output to the second control signal generation circuit 222. For example, as shown in FIG. 14, the second transition detection circuit 221 operates at the drop of the high frequency clock signal VCLK. When the second transition detection circuit 221 detects the rise of the second phase synchronization signal Psync2 (timing A in FIG. 14), the second transition detection circuit 221 outputs a pulse signal having a length substantially equal to a single clock width of a high frequency clock signal VCLK at a timing after eight clock outputs of the high frequency clock signal VCLK (timing B in FIG. 14). Then, when the second transition detection circuit 221 detects the rise of the second clock signal CLK2 (timings C and D in FIG. 14), the second transition detection 221 outputs a pulse signal having a length substantially equal to a single clock width (Tv) of a high frequency clock signal VCLK. The eight clock outputs substantially equal to the signal delay time of the second transition detection circuit 221.

The first control signal generation circuit 212 generates two first control signals CTL1a, CTL1b based on the high frequency clock signal VCLK, the first control date item Dcnt1, and the first detection signal Strans1. The generated first control signals CTL1a, CTL1b are both output to the first clock generation circuit 213.

Figure 15:
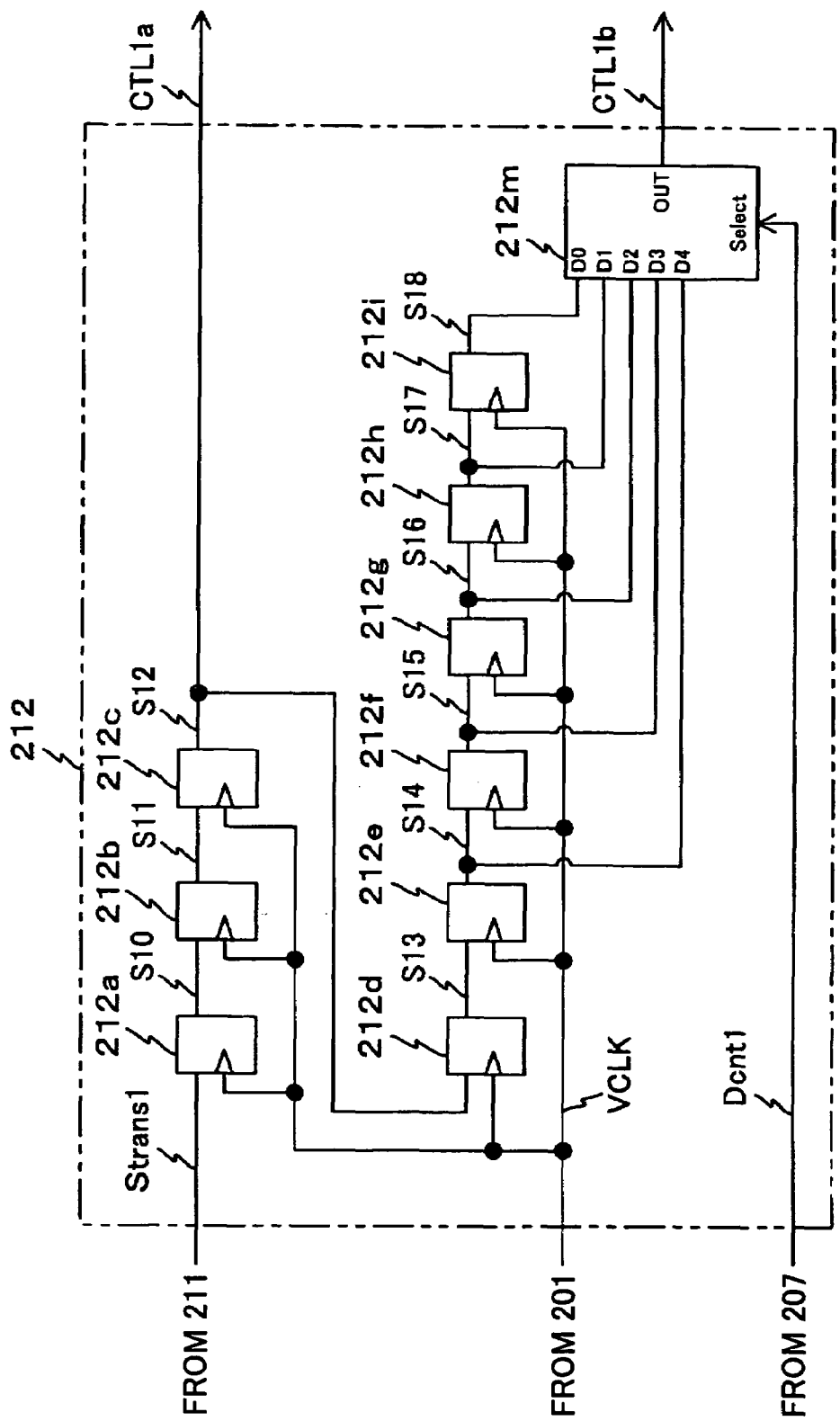
FIG. 15 is a circuit diagram for describing a configuration of a control signal generation circuit according to an embodiment of the present invention.
Figure 17:
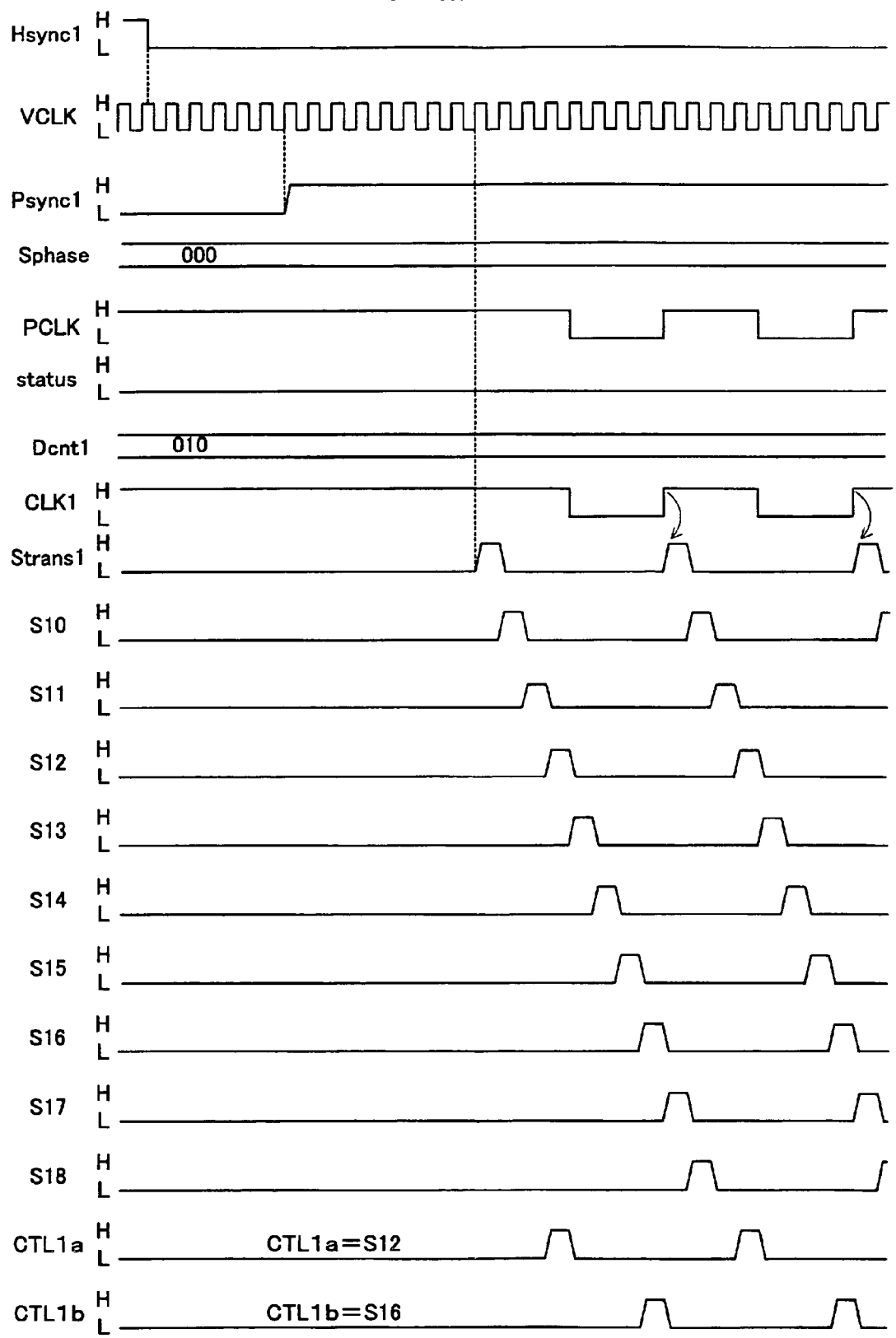
FIG. 17 is an exemplary timing chart for describing the operation of a first control signal generation circuit according to an embodiment of the present invention.

As shown in FIG. 15, the first control signal generation circuit 212 according to an embodiment of the present invention includes nine shift registers 212a-212i and a multiplexer 212m. As shown in FIG. 17, each of the shift registers 212a-212i operates at the rise of the high frequency clock signal VCLK and outputs a signal (S10-S17) at a delayed timing in response to an input signal. The delay of the output signals (S10-S17) is substantially equal to a single clock output of a high frequency clock signal VCLK.

For example, the first control signal generation circuit 212 shown in FIG. 15 is set in a manner that: the first detection signal Strans1 is input to the shift register 212a; the output signal (S10) from the shift register 212a is input to the shift register 212b; the output signal (S11) from the shift register 212c is input to the shift register 212c; the output signal (S12) from the shift register 212c is input to the shift register 212d; the output signal (S13) from the shift register 212d is input to the shift register 212e; the output signal (S14) from the shift register 212e is input to the shift register 212f; the output signal (S15) from the shift register 212*f* is input to the shift register 212*g*; the output signal (S16) from the shift register 212*g* is input to the shift register 212*h*; the output signal (S17) from the shift register 212*h* is input to the shift register 212*i*; the output signal (S18) from the shift register 212*i* is input to a D0 port of the multiplexer 212*m*. Furthermore, the first control signal generation circuit 212 shown in FIG. 15 is set in a manner that: the output signal (S17) from the shift register 212*h* is input to a D1 port of the multiplexer 212*m*; the output signal (S16) from the shift register 212*g* is input to a D2 port of the multiplexer 212*m*; the output signal (S15) from the shift register 212*f* is input to a D3 port of the multiplexer 212*m*; and the output signal (S14) from the shift register 212*e* is input to a D4 port of the multiplexer 212*m*. The output signal (S12) from the shift register 212*c* serves as the first control signal CTL1*a*.

The first control data item Dcnt1 is input to a selection port of the multiplexer 212*m*. For example, as shown in the table of FIG. 16, the multiplexer 212*m* is set so that: the D0 port is selected when the first control data item Dcnt1 is "000"; the D1 port is selected when the first control data item Dcnt is "001"; the D2 port is selected when the first control data item Dcnt1 is "010"; the D3 port is selected when the first control data item Dcnt1 is "011"; and the D4 port is selected when the first control data item Dcnt1 is "100". The output signal from the multiplexer 212*m* serves as the first control signal CTL1*b*. FIG. 17 shows an exemplary case where the first control data item Dcnt1 is "010".

The second control signal generation circuit 222 generates two second control signals CTL2*a*, CTL2*b* based on the high frequency clock signal VCLK, the second control data item Dcnt2, and the second detection signal Strans2. The generated second control signals CTL2*a*, CTL2*b* are both output to the second clock generation circuit 223.

Figure 18:
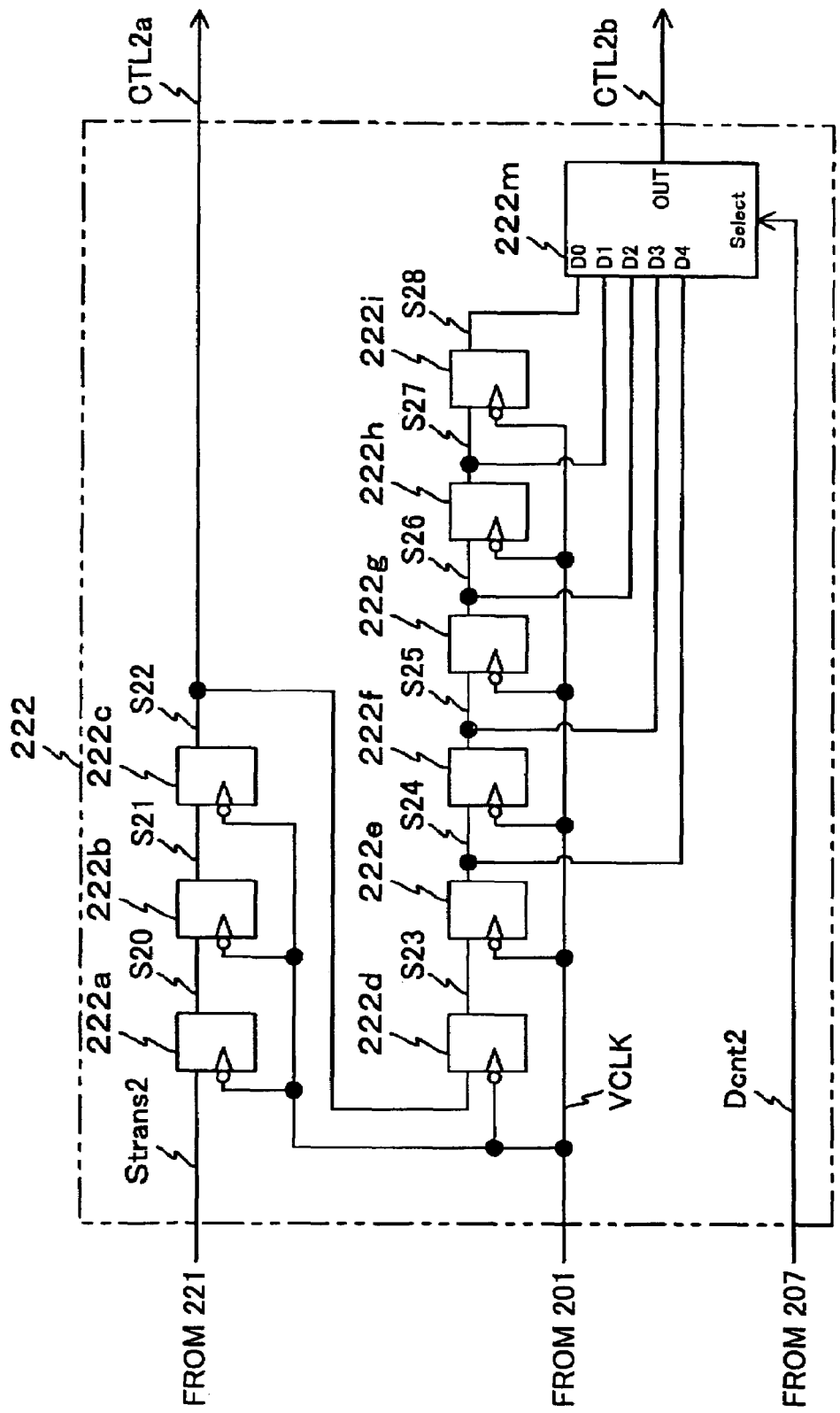
FIG. 18 is a circuit diagram for describing a configuration of a second control signal generation circuit.
Figure 20:
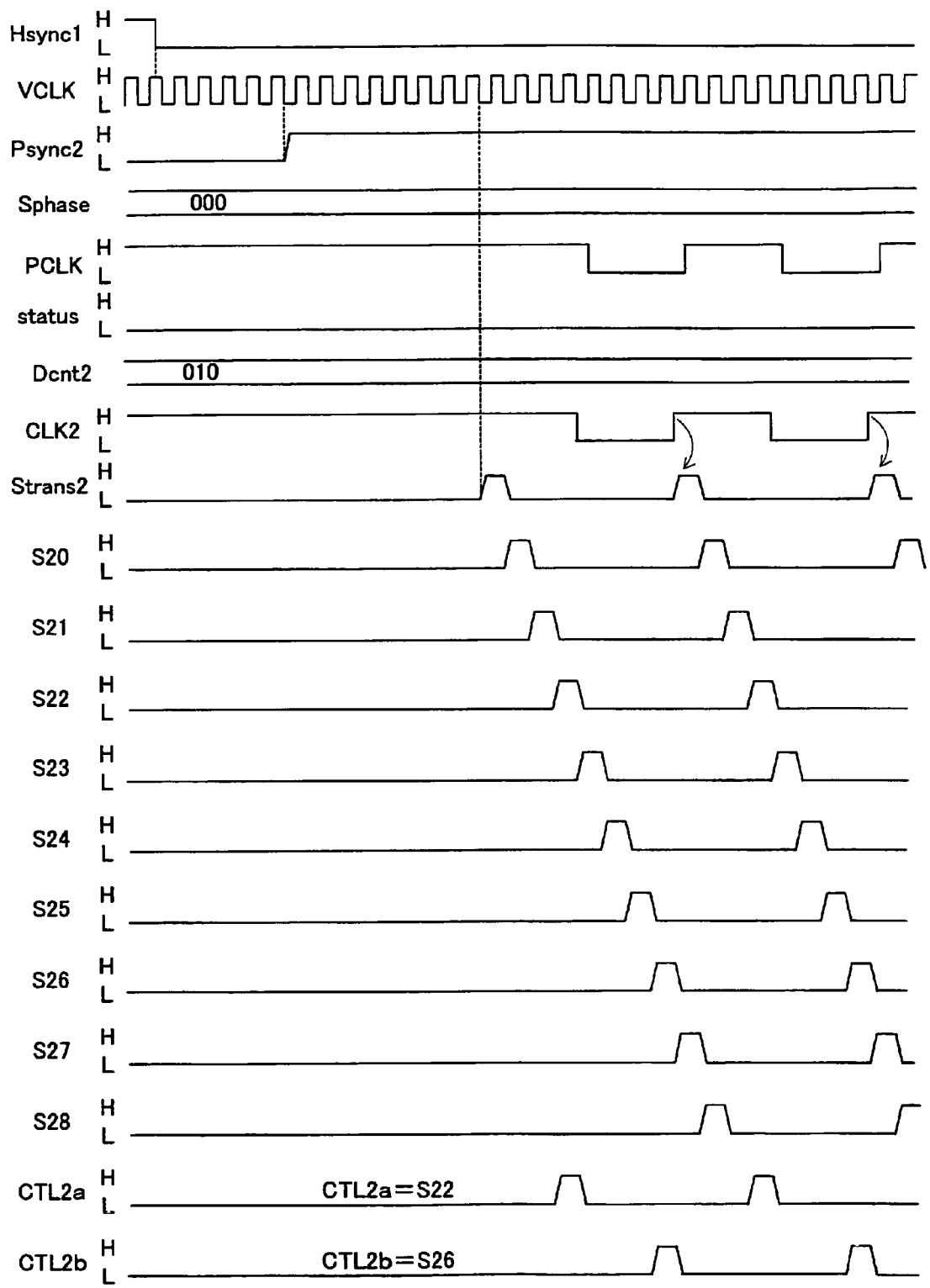
FIG. 20 is an exemplary timing chart for describing the operation of the second control signal generation circuit according to an embodiment of the present invention.

As shown in FIG. 18, the second control signal generation circuit 222 according to an embodiment of the present invention includes nine shift registers 222*a*-222*i* and a multiplexer 222*m*. As shown in FIG. 20, each of the shift registers 222*a*-222*i* operates at the drop of the high frequency clock signal VCLK and outputs a signal (S20-S27) at a delayed timing in response to an input signal. The delay of the output signals (S20-S27) is substantially equal to a single clock output of a high frequency clock signal VCLK.

For example, the second control signal generation circuit 222 shown in FIG. 18 is set in a manner that: the second detection signal Strans2 is input to the shift register 222*a*; the output signal (S20) from the shift register 222*a* is input to the shift register 222*b*; the output signal (S21) from the shift register 222*c* is input to the shift register 222*c*; the output signal (S22) from the shift register 222*c* is input to the shift register 222*d*; the output signal (S23) from the shift register 222*d* is input to the shift register 222*e*; the output signal (S24) from the shift register 222*e* is input to the shift register 222*f*; the output signal (S25) from the shift register 222*f* is input to the shift register 222*g*; the output signal (S26) from the shift register 222*g* is input to the shift register 222*h*; the output signal (S27) from the shift register 222*h* is input to the shift register 222*i*; the output signal (S28) from the shift register 222*i* is input to a D0 port of the multiplexer 222*m*. Furthermore, the second control signal generation circuit 222 shown in FIG. 17 is set in a manner that: the output signal (S27) from the shift register 222*h* is input to a D1 port of the multiplexer 222*m*; the output signal (S26) from the shift register 222*g* is input to a D2 port of the multiplexer 222*m*; the output signal (S25) from the shift register 222*f* is input to a D3 port of the multiplexer 222*m*; and the output signal (S24) from the shift register 222*e* is input to a D4 port of the multiplexer 222*m*.

The output signal (S22) from the shift register 222*c* serves as the second control signal CTL2*a*.

The second control data item Dcnt2 is input to a selection port of the multiplexer 222*m*. For example, as shown in the table of FIG. 19, the multiplexer 222*m* is set so that: the D0 port is selected when the second control data item Dcnt2 is "000"; the D1 port is selected when the second control data item Dcnt2 is "001"; the D2 port is selected when the second control data item Dcnt2 is "010"; the D3 port is selected when the second control data item Dcnt2 is "011"; and the D4 port is selected when the second control data item Dcnt2 is "100". The output signal from the multiplexer 222*m* serves as the second control signal CTL2*b*. FIG. 20 shows an exemplary case where the second control data item Dcnt2 is "010".

Figure 21:
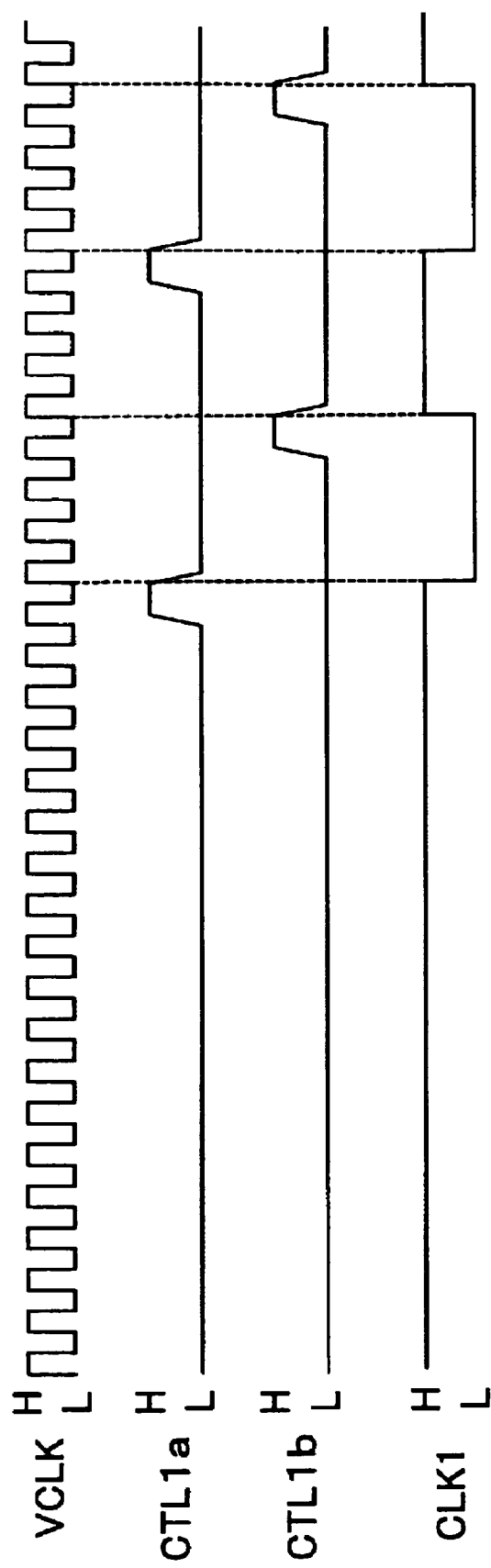
FIG. 21 is an exemplary table for describing the operation of a first clock generation circuit according to an embodiment of the present invention.

Returning to FIG. 6, the first clock generation circuit 213 generates a first clock signal CLK1 based on the high frequency clock signal VCLK and the first control signals CTL1*a*, CTL1*b*. The generated first clock signal CLK1 is output to the first transition detection circuit 211 and the multiplexer 233. For example, as shown in FIG. 21, the first clock generation circuit 213 operates at the rise of the high frequency clock signal VCLK and outputs a first clock signal CLK1 in accordance with the first control signal CTL1*a*, CTL1*b*. The output first clock signal CLK1 becomes "L" when the first control signal CTL*a* is "H", and becomes "H" when the first control signal CTL*b* is "H".

Figure 22:
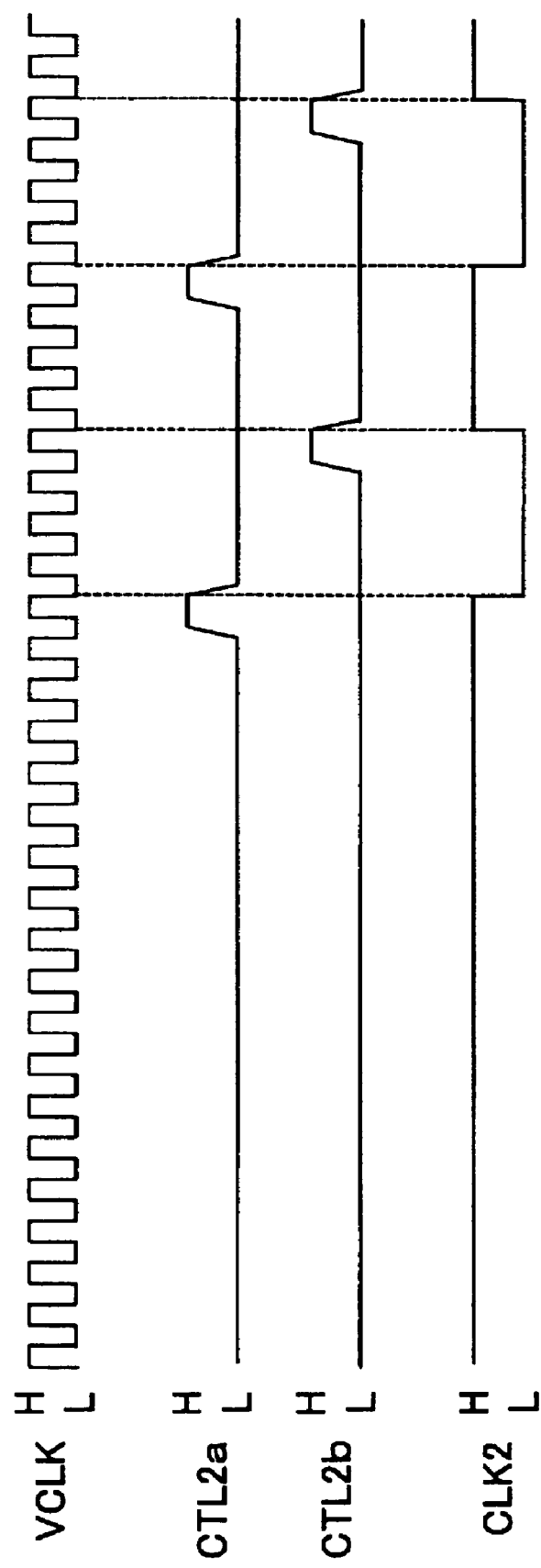
FIG. 22 is an exemplary table for describing the operation of a second clock generation circuit according to an embodiment of the present invention.

The second clock generation circuit 223 generates a second clock signal CLK2 based on the high frequency clock signal VCLK and the second control signals CTL2*a*, CTL2*b*. The generated second clock signal CLK2 is output to the second transition detection circuit 221 and the multiplexer 233. For example, as shown in FIG. 22, the second clock generation circuit 223 operates at the drop of the high frequency clock signal VCLK and outputs a second clock signal CLK1 in accordance with the second control signal CTL2*a*, CTL2*b*. The output second clock signal CLK2 becomes "L" when the second control signal CTL2*a* is "H", and becomes "H" when the second control signal CTL2*b* is "H".

Since the pairs of the first and second transition detection circuits 211, 221, the first and second control signal generation circuits 212, 222, and the first and second clock signal generation circuits 213, 223 can each be manufactured by using components that are substantially the same, manufacture costs can be reduced.

Figure 23:
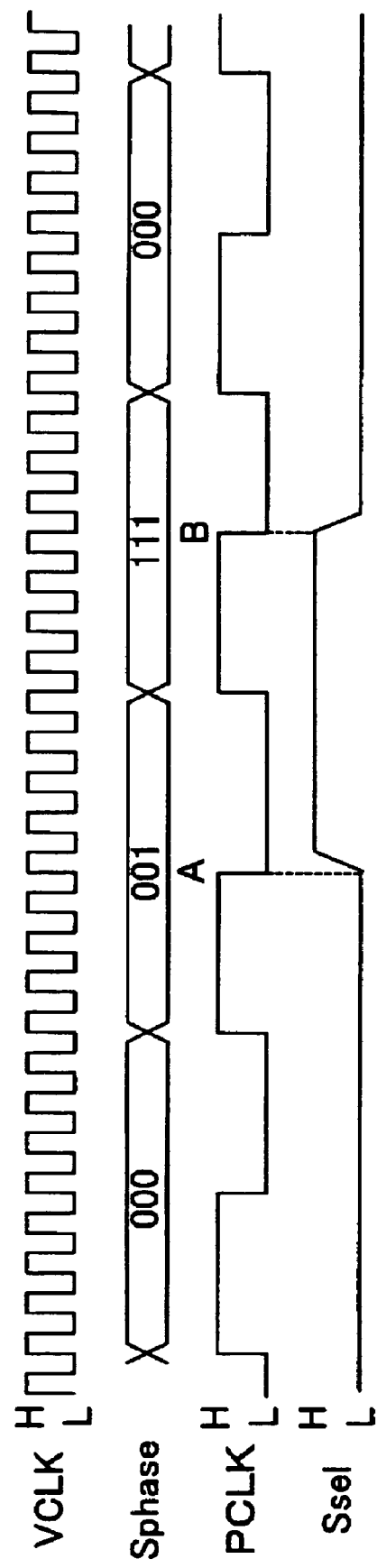
FIG. 23 is an exemplary table for describing the operation of a selection signal generation circuit according to an embodiment of the present invention.

The selection signal generation circuit 231 generates a selection signal Ssel based on bit0 of the phase data item Sphase, the phase status signal Pstat, and the pixel clock signal PCLK (signal output from the multiplexer 233). The generated selection signal Ssel is output to a selection port of the multiplexer 233. More specifically, the selection signal generation circuit 231 initializes the level of the selection signal Ssel to "H" when the phase status signal Pstat changes from "L" to "H". The selection signal Ssel is set in accordance with the change of signal level of the phase status signal Pstat. For example, as shown in FIG. 23, the selection signal Ssel changes in synchronization with the timing of the drop of the pixel clock signal PCLK (timing A, B in FIG. 23) in a case where the bit 0 of the phase data item Sphase is "1". The level of the selection signal Ssel is initialized to "L" when the phase status signal Pstat changes from "H" to "L".

Figure 24:
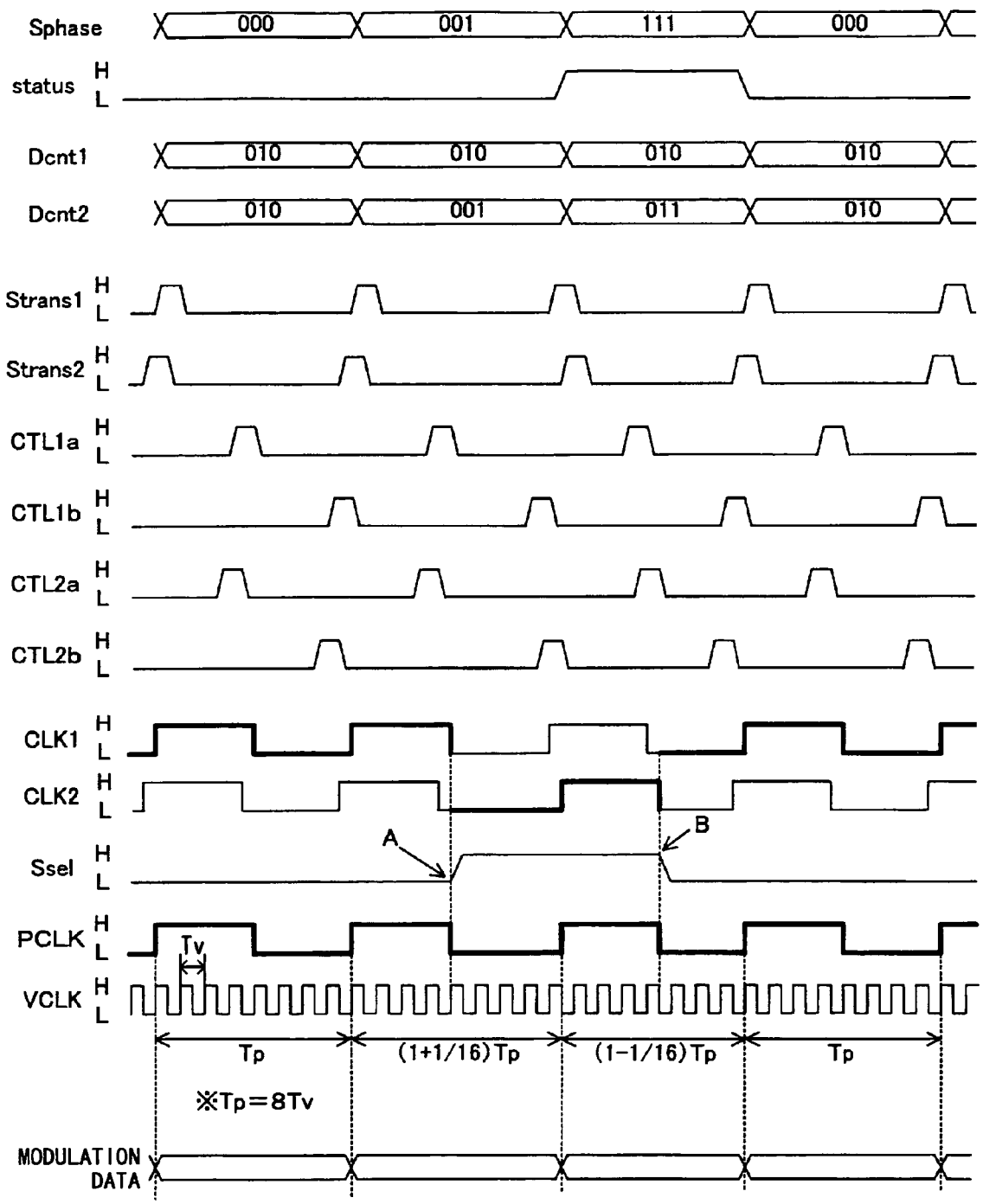
FIG. 24 is an exemplary timing chart for describing the operation of a multiplexer according to an embodiment of the present invention.
Figure 25:
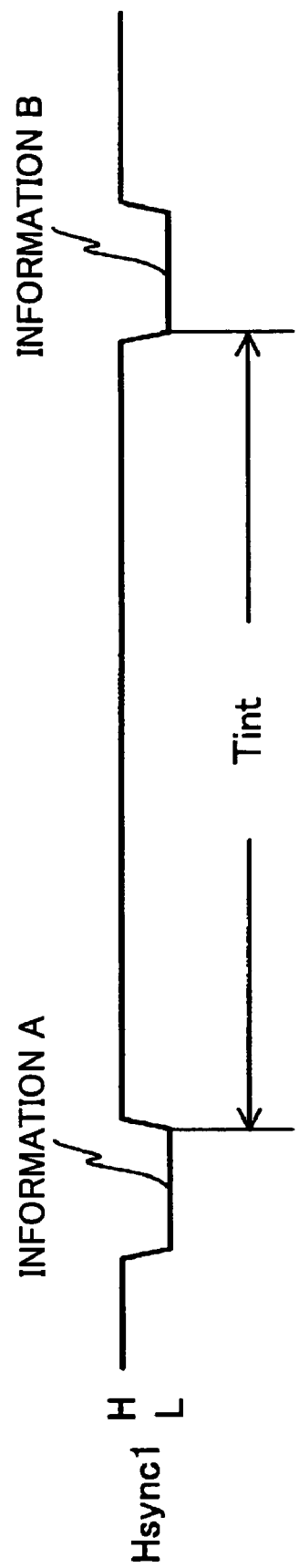
FIG. 25 is an exemplary timing chart for describing a first modified example of a determination process for determining authenticity of start information in a phase synchronization control circuit according to an embodiment of the present invention.

Returning to FIG. 6, the multiplexer 233 selects either one of the first clock signal CLK1 or the second clock signal CLK2 based on the selection signal Ssel and outputs the selected clock signal (CLK1 or CLK2) as the pixel clock signal PCLK. For example, as shown in FIG. 24, the first clock signal CLK1 is selected when the selection signal Ssel is "L", and the second clock signal CLK2 is selected when the selection signal Ssel is "H" (period between timings A and B in FIG. 24). Accordingly, the cycle of the pixel clock signal PCLK becomes Tp (reference cycle=8 Tv) when the phase data item Sphase is "000", the cycle of the pixel clock signal PCLK becomes (1+1/16) Tp when the phase data item Sphase is "001", and the cycle of the pixel clock signal PCLK is becomes (1−1/16) Tp when the phase data item Sphase is "111". In other words, as shown in FIG. 24, the pixel clock signal PCLK is adjusted with resolution of a half (½) cycle of the high frequency clock signal VCLK. Thereby, a pixel clock signal PCLK synchronizing with the start indication information is generated. As described above, since none of the phase status signal Pstat, the first phase synchronization signal Psync1, and the second phase synchronization signal Psync2 change when the length of the start indication information is less than ½ of the reference cycle Tp of the pixel clock signal, the pixel clock signal PCLK, which synchronizes with the start indication information, is not generated. Therefore, even in a case where factors such as noise causes the first horizontal synchronizing signal Hsync1 to temporarily change to "L" (low level), such change has no effect on the pixel clock signal PCLK from the pixel clock generation circuit 20.

Returning to FIG. 4, the image process circuit 30 generates image data based on image information from an upper level apparatus. The generated image data are output to the laser drive data generation circuit 40 in synchronization with the pixel clock signal PCLK from the pixel clock generation circuit 20.

The laser drive data generation circuit 40 generates a modulation data item based on the pixel clock signal PCLK from the pixel clock generation circuit 20 and the image data from the image process circuit 30. The modulation data item is for modulating the light beam from the semiconductor laser LD. The modulation data are generated such that a single pixel corresponds to a single clock output of a pixel clock signal PCLK. Therefore, as exemplarily shown in FIG. 24, the length of modulation data (i.e. pixel width) changes in correspondence with the clock width of the pixel clock signal PCLK. The generated modulation data are output to the laser drive circuit 50.

Hence, the pixel clock generation circuit 20 serves as a clock signal generation circuit according to an embodiment of the present invention, in which the phase synchronization control circuit 203 is included in a determination circuit according to an embodiment of the present invention. Furthermore, the high frequency clock generation circuit 201, the status signal generation circuit 205, the control data generation circuit 207, the first and second transition detection circuits 211, 221, the first and second control signal generation circuits 212, 222, the first and second clock generation circuits 213, 223, the selection signal generation circuit 231, and the multiplexer 233 are included in a generation circuit according to an embodiment of the present invention.

In the optical scanning apparatus 900, the polygon mirror 808 is included in a deflection part according to an embodiment of the present invention. Furthermore, the fθ lens 806, the return mirror 807, the toroidal lens 812 are included in an optical system according to an embodiment of the present invention. Furthermore, the photo-sensitive element 813 is included in a detection sensor according to an embodiment of the present invention. Furthermore, the laser drive data generation circuit 40 and the laser drive circuit 50 are included in a light source control circuit according to an embodiment of the present invention.

Furthermore, the laser printer 100 serves as an image forming apparatus according to an embodiment of the present invention, in which the charging brush 902, the developing roller 903, the toner cartridge 904, and the transfer roller 911 are included in a transfer apparatus according to an embodiment of the present invention.

As described above, with the phase synchronization control circuit 203 in the pixel clock generation circuit (clock signal generation circuit) 20 according to an embodiment of the present invention, a counting operation is started by the two counters (203c, 203d) when the first horizontal synchronizing signal Hsync1 changes from "H" to "L". Then, the two phase synchronization signals (Psync1, Psync2) and the phase status signal Pstat change when the count value of the respective counters (203c, 203d) reaches "4". Then, the generation of pixel clock signal PCLK is started in synchronization with the first horizontal synchronizing signal Hsync1. Meanwhile, the two phase synchronization signals (Psync1, Psyn2) and the phase status signal Pstat do not change in a case where the first horizontal synchronizing signal Hsync1 changes from "L" to "H" before the count value of the respective counters (203c, 203d) reaches "4". In this case, the generation of pixel clock signals PCLK synchronizing with the first horizontal synchronizing signal Hsync1 does not start. In other words, the phase synchronization control circuit 203 determines that start information (information which informs the start of generating clock signals) is authentic (true) when the length of the start information is equal to or greater than a predetermined value. For example, even if start information is input in a case where the first horizontal synchronizing signal Hsync1 temporarily becomes "L" due to noise, the phase synchronization control circuit 203 is able to determine that the input start information is false (not authentic). Thereby the pixel clock signal PCLK will not be generated in synchronization with the false start information. Accordingly, the clock signal generation circuit of the present invention can precisely generate clock signals used for scanning a light beam from a light source to a scan target without being affected by noise.

Although the conventional clock generation circuit generates clock signals having the same cycle as resolution with a high frequency clock generation circuit, the pixel clock generation circuit 20 according to an embodiment of the present invention can control the phase of the pixel clock signals with a resolution which is ½ of the cycle of the high frequency clock signals. Thereby, manufacture costs and energy consumption of the high frequency clock generation circuit can be reduced.

Furthermore, since the optical scanning apparatus 900 according to an embodiment of the present invention includes the above-described pixel clock generation circuit 20 which is resistant to noise, the light beam can be stably irradiated from the semiconductor laser LD. Thereby, the photoconductor drum 901 can be stably scanned.

Since the laser printer (image forming apparatus) 100 according to an embodiment of the present invention includes the above-described optical scanning apparatus 900, high quality image forming can be achieved.

Although the value of the reference count stored in the register 203e is "4" (i.e. value corresponding to ½ of a reference cycle Tp of a pixel clock signal PCLK) according to the above-described embodiment of the present invention, the reference count may alternatively be set with other values in accordance with, for example, the type of noise superposing the first horizontal synchronizing signal Hsync1. Alternatively, a DIP switch, for example, may be included in the printed board 802 so that the value of the reference count can be set or changed through the DIP switch. Alternatively, a control panel (not shown) may be included in the laser printer 100 so that the value of the reference count can be set or changed in a maintenance mode of the control panel.

Although the phase synchronization control circuit 203 determines authenticity of the start information in accordance with the length of the start information according to the above-described embodiment of the present invention, the authenticity of the start information may alternatively be determined by other criteria. In a first modified example 1 of the present invention shown in FIG. 25, the phase synchronization control circuit 203 may determine authenticity, of the start information by comparing a start information item (start information item B in FIG. 25) with a previous start information item (start information item A in FIG. 25). For example, the phase synchronization control circuit 203 determines that the start information item B is authentic (true) if the time elapsed from the start information item A (elapse time Tint in FIG. 25) is equal to or greater than a predetermined time, and determines that the start information item B is not authentic (false) if the time elapsed from the start information item A (elapse time Tint in FIG. 25) is less than the predetermined time. One example of the predetermined time may be the reference time for scanning a single line. In this determination, reference may be made to the length of the start information for improving the precision of the determination.

Figure 26:
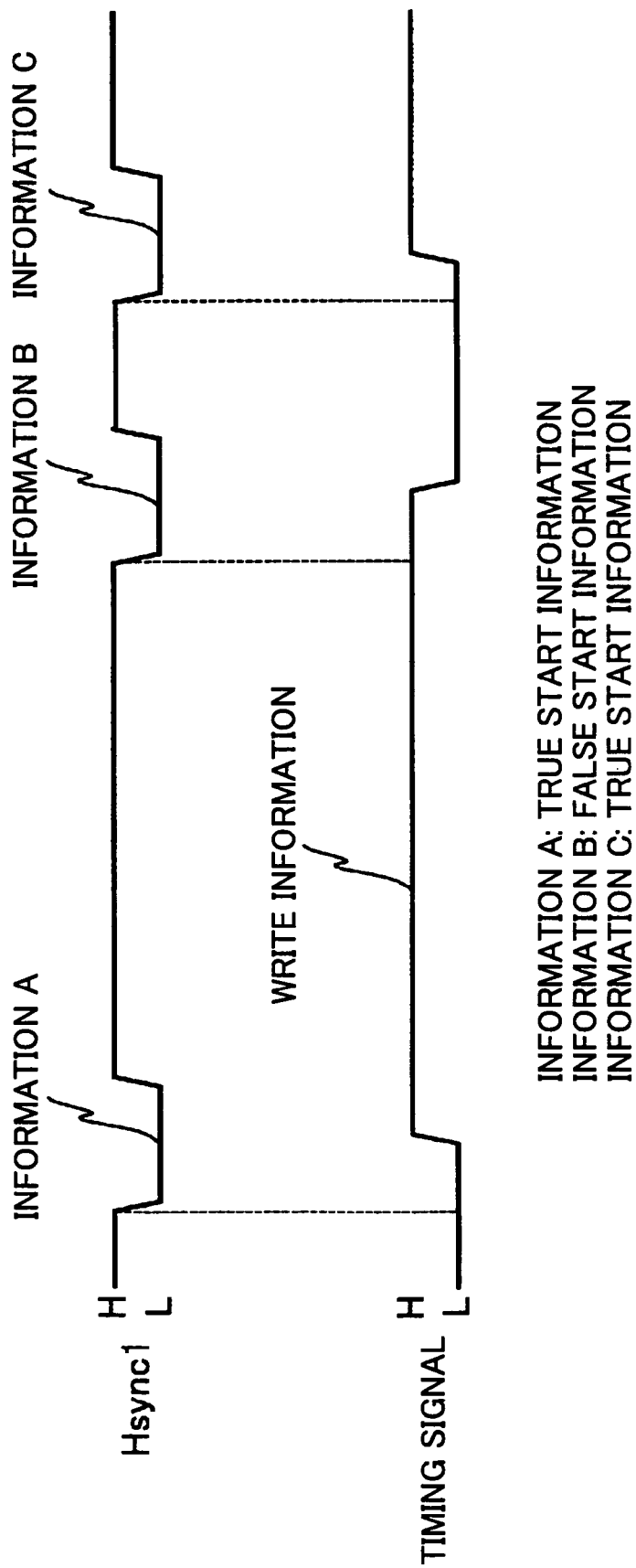
FIG. 26 is an exemplary timing chart for describing a second modified example of a determination process for determining authenticity of start information in a phase synchronization control circuit according to an embodiment of the present invention.

In a second modified example 2 of the present invention shown in FIG. 26, during a period where the light beam from the semiconductor laser LD includes image information, the phase synchronization control circuit 203 may determine authenticity of the start information by referring to timing signal which include information indicating that the image information is being written (portion where the level of the timing signal is "H"). For example, the phase synchronization control circuit 203 determines that the start information is authentic (true) if the timing signal at the drop of the first horizontal synchronizing signal Hsync1 is "L" (information A and information C in FIG. 26), and determines that the start information is not authentic (false) if the timing signal at the drop of the first horizontal synchronizing signal Hsync1 is "H" (information B in FIG. 26). For example, the timing signal may be generated in the laser drive data generation circuit 40. In this determination, reference may be made to the length of the start information for improving the precision of the determination.

Figure 27:
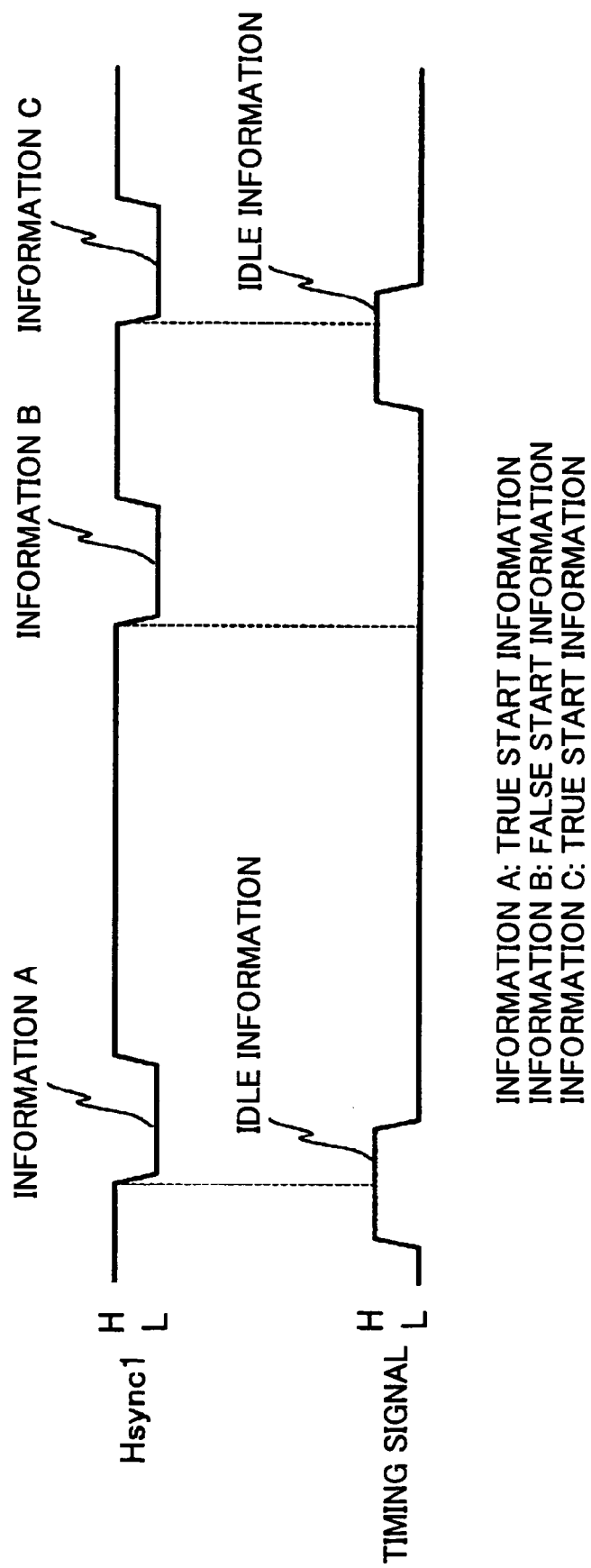
FIG. 27 is an exemplary timing chart for describing a third modified example of a determination process for determining authenticity of start information in a phase synchronization control circuit according to an embodiment of the present invention.

In a third modified example 3 of the present invention shown in FIG. 27, during a period where the light beam from the semiconductor laser LD does not include image information, the phase synchronization control circuit 203 may determine authenticity of the start information by referring to a timing signal which includes information indicating an idling state (portion where the level of the timing signal is "H"). For example, the phase synchronization control circuit 203 determines that the start information is authentic (true) if the timing signal at the drop of the first horizontal synchronizing signal Hsync1 is "H" (information A and information C in FIG. 27), and determines that the start information is not authentic (false) if the timing signal at the drop of the first horizontal synchronizing signal Hsync1 is "L". (information B in FIG. 26). For example, the timing signal may be generated in the laser drive data generation circuit 40. In this determination, reference may be made to the length of the start information for improving the precision of the determination.

Furthermore, at least a portion of the circuit(s) included in the process circuit 815 may be mounted to the printed board 802 according to an embodiment of present invention.

Although the laser printer 100 is described as an example of the image forming apparatus of the present invention, other alternative apparatuses may be used. The image forming apparatus may be, for example, a digital copier, a scanner, a facsimile, or a multi-function machine, where each includes the optical scanning apparatus 900 according to an embodiment of the present invention. In other words, high quality image formation can be achieved by providing an image forming apparatus including the optical scanning apparatus 900.

Further, the present invention is not limited to these embodiments, but variations and modifications may be made without departing from the scope of the present invention.

The present application is based on Japanese Priority Application No.2005-044075 filed on Feb. 21, 2005, with the Japanese Patent Office, the entire contents of which are hereby incorporated by reference.

What is claimed is:

1. A clock signal generation circuit configured to generate one or more clock signals for performing a scanning operation by scanning a light beam from a light source to a scan target, the clock signal generation circuit comprising:
    a determination circuit configured to determine authenticity of start information in accordance with at least one of the length of the start information and the timing at which the start information is input; and
    a generation circuit configured to generate the clock signals in synchronization with the start information when the determination circuit determines that the start information is authentic,
    wherein the determination circuit is configured to determine that the start information is authentic when the length of the start information is equal to or greater than a predetermined value.

2. The clock generation circuit as claimed in claim 1, wherein the predetermined value is ½ of the cycle of the clock signals.

3. The clock generation circuit as claimed in claim 1, wherein the predetermined value is changeable.

4. The clock generation circuit as claimed in claim 1, wherein the determination circuit is configured to determine that the start information is authentic when the start information is input within a predetermined period of time.

5. The clock generation circuit as claimed in claim 1, wherein during a period when the light beam includes image information, the determination circuit determines that the start information is authentic by referring to a timing signal indicating that the image information is being written.

6. The clock generation circuit as claimed in claim 1, wherein during a period when the light beam does not include image information, the determination circuit determines that the start information is authentic by referring to a timing signal indicating an idling state.

7. An optical scanning apparatus configured to perform a scanning operation by scanning a light beam from a light source to a scan target scanning, the optical scanning apparatus comprising:
    a detection sensor configured to detect the start of the scanning operation and to output signals including start information indicative of the start of the scanning operation;
    a clock signal generation circuit configured to receive the signals output from the detection sensor, the clock signal generation circuit including a determination circuit configured to determine authenticity of the start information in accordance with at least one of the length of the start information and the timing at which the start information is input, and a generation circuit configured to generate the clock signals in synchronization with the start information when the determination circuit determines that the start information is authentic; and an optical control circuit configured to control the light source in accordance with the clock signals generated by the clock signal generation circuit, wherein the determination circuit is configured to determine that the start information is authentic when the length of the start information is equal to or greater than a predetermined value.

8. The optical scanning apparatus as claimed in claim 7, wherein the optical control circuit is configured to adjust the length of time for irradiating the light beam from the light source for changing the width of a pixel in image information in correspondence with the clock width of the clock signals.

9. An image forming apparatus comprising:
the optical scanning apparatus as claimed in claim 7.

* * * * *